United States Patent [19]
Isshiki

[11] Patent Number: 5,822,189
[45] Date of Patent: Oct. 13, 1998

[54] ELECTRICAL CONNECTION BOX, A CONNECTION CONSTRUCTION, A BUSBAR FIXING CONSTRUCTION AND A CONNECTION TERMINAL

[75] Inventor: Yoshihiro Isshiki, Yokkaichi, Japan

[73] Assignee: Sumitomo Wiring Systems, Ltd., Japan

[21] Appl. No.: 764,987

[22] Filed: Dec. 13, 1996

[30] Foreign Application Priority Data

| Dec. 14, 1995 | [JP] | Japan | 7-325682 |
| Dec. 14, 1995 | [JP] | Japan | 7-325776 |
| Dec. 18, 1995 | [JP] | Japan | 7-328726 |
| Dec. 21, 1995 | [JP] | Japan | 7-333214 |
| Dec. 21, 1995 | [JP] | Japan | 7-333402 |
| Dec. 25, 1995 | [JP] | Japan | 7-336608 |

[51] Int. Cl.$^6$ .............. H05K 7/14; H01R 9/09; H01R 13/64; H01R 23/70
[52] U.S. Cl. .......... 361/736; 361/728; 361/775; 439/76.2; 439/632; 439/633; 439/681; 174/59
[58] Field of Search ............... 361/728, 736, 361/775, 826; 439/76.1, 76.2, 74, 75, 493, 567, 570, 633, 680, 681, 949, 632; 174/59, 70 B, 71 B, 72 B, 88 B, 99 B, 129 B, 133 B

[56] References Cited

U.S. PATENT DOCUMENTS

| 3,518,620 | 6/1970 | Bushey et al. ............... 439/681 |
| 3,576,519 | 4/1971 | Jayne et al. ................. 439/633 |
| 4,307,927 | 12/1981 | Mollman .................. 439/681 |
| 4,629,267 | 12/1986 | Stepan ....................... 439/75 |
| 4,688,149 | 8/1987 | Inoue et al. ............... 361/775 |
| 4,922,380 | 5/1990 | Kuki et al. ................. 361/759 |
| 4,959,018 | 9/1990 | Yamamoto et al. ........ 439/76.1 |
| 5,295,842 | 3/1994 | Ozaki et al. .............. 439/76.2 |
| 5,509,812 | 4/1996 | Comerci et al. ........... 439/76.1 |
| 5,655,927 | 8/1997 | Maue et al. ............... 439/510 |

FOREIGN PATENT DOCUMENTS

| 0 240 453 | 10/1987 | European Pat. Off. . |
| 62-181610 | 9/1987 | Japan . |
| 6-77674 | 3/1994 | Japan . |

Primary Examiner—Leo P. Picard
Assistant Examiner—John B. Vigushin
Attorney, Agent, or Firm—Anthony J. Casella; Gerald E. Hespos; Ludomir A. Budzyn

[57] ABSTRACT

To accommodate an electronic circuit board in an electrical connection box without accommodating it in a container. An electronic circuit board 14 is placed above a portion of insulation plates 19 and busbars 13 stacked on a lower casing 11. Circuit portions 14a of the circuit board 14 are electrically connected with the busbars 13 via connection terminals 17. There are provided housings 16 for retaining the connection terminals 17 in terminal chambers arranged side by side therein. The connection terminals 17 are connected with the circuit portions 14a by fitting the housings 16 to the periphery of the circuit board 14 sideways. The circuit board 14 is placed on the upper faces of supports 11c projecting from the lower casing 11 while the connection terminals are fitted to the tabs of the busbars from above. An upper casing 12 is lockingly fixed with the lower casing 11, thereby pressingly fixing the upper surfaces of the housings 16 mounted on the circuit board 14 by shoulder portions 12c provided at the upper casing 12.

15 Claims, 16 Drawing Sheets

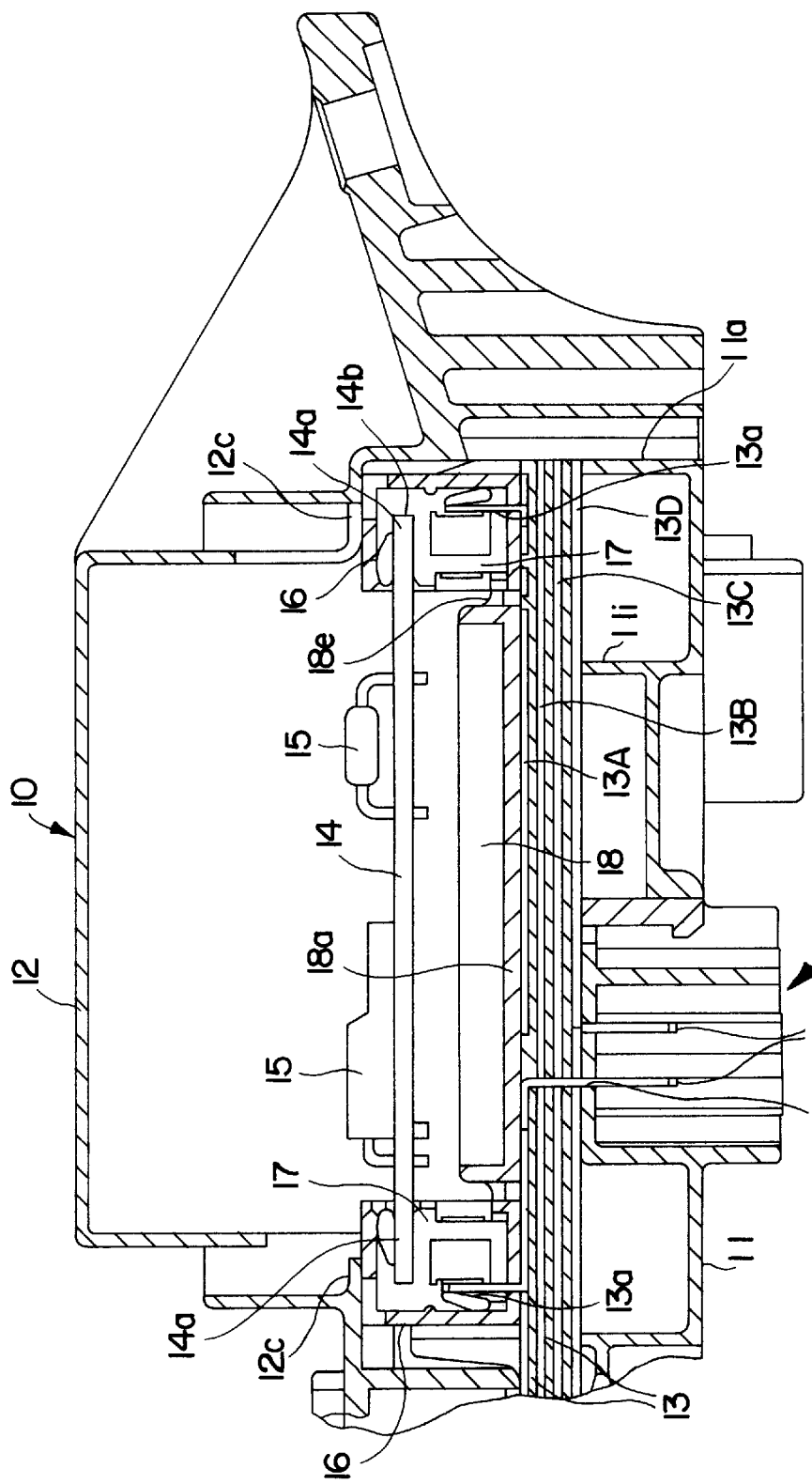

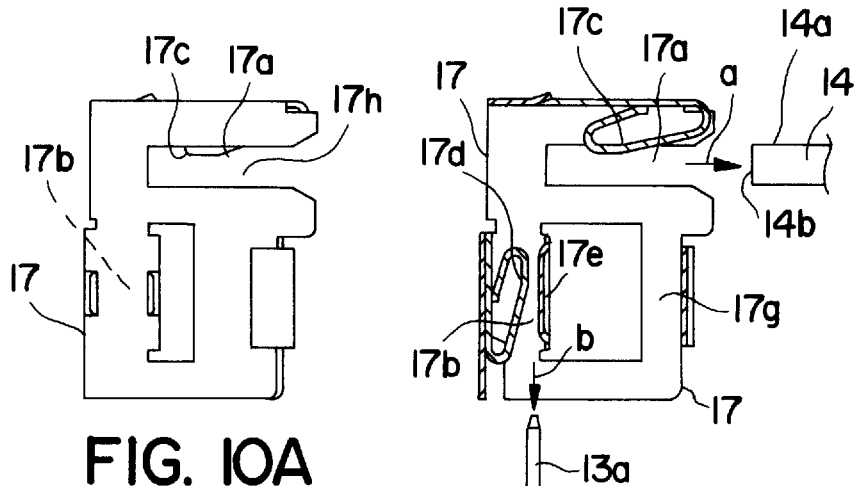
FIG. 10A
FIG. 10B
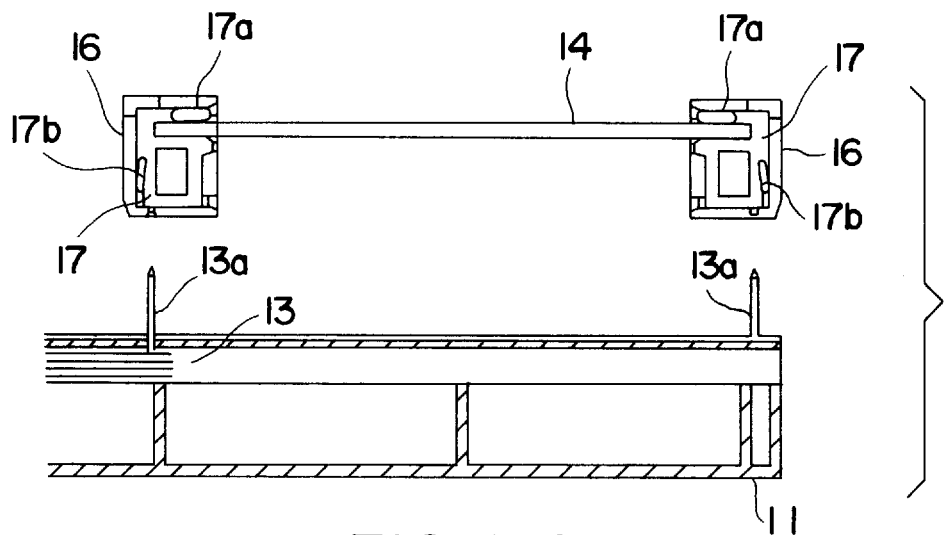
FIG. 11A

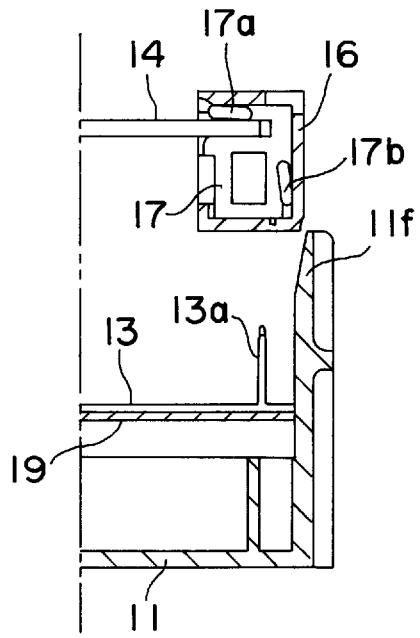 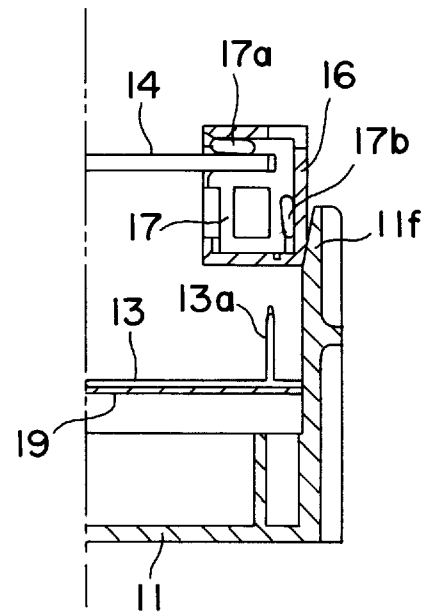
FIG. 16A  FIG. 16B
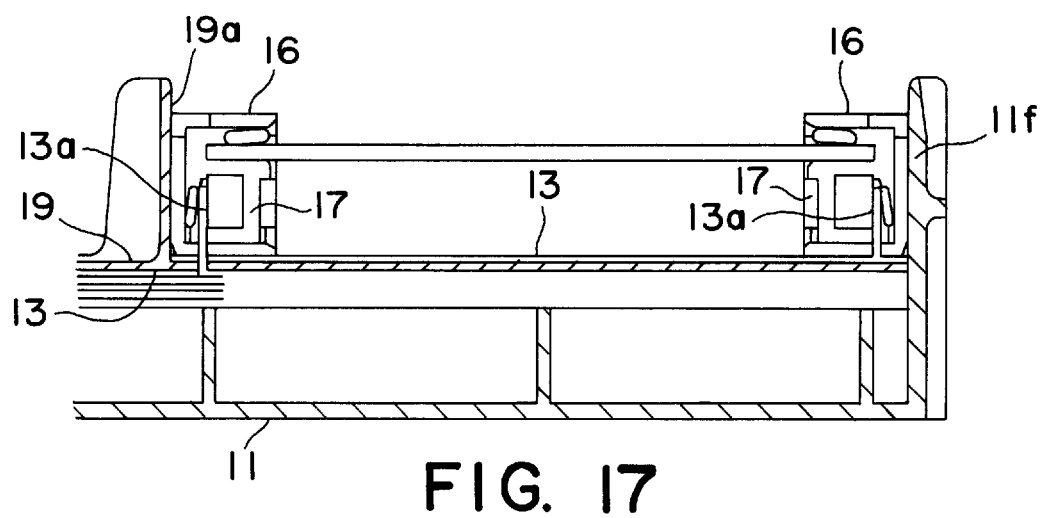
FIG. 17

2

ELECTRICAL CONNECTION BOX, A CONNECTION CONSTRUCTION, A BUSBAR FIXING CONSTRUCTION AND A CONNECTION TERMINAL

BACKGROUND OF THE INVENTION

1. Field of the Invention

The present invention relates to an electrical connection box with electronic circuitry to be connected with an automotive wiring harness.

2. Description of the Prior Art

A known electrical connection box is shown in FIGS. 18(A) to 18(C) and is identified generally by the numeral 1. An outer surface of the electrical connection box 1 is formed to include a housing 1a and a pair of parallel guide grooves 1b leading to the housing 1a. A busbar 4 is disposed in the electrical connection box 1 and has tabs 4a in proximity to the housing 4. Terminals 5 have busbar side connection portions 5a accommodated in the housing 1a of the electrical connection box 1 and are fitted to the tabs 4a projecting upward from the busbar 4. An electronic circuit board 3 is accommodated in a container 2 that is separate from the electrical connection box 1. By fittably sliding guide portions 2b of the container 2 along guide grooves 1b formed at the outer surface of the electrical connection box 1, circuit portions 3a of the circuit board 3 are connected with circuit side connection portions 5b of the connection terminals 5 sideways, thereby electrically connecting the busbar 4 of the electrical connection box 1 with the circuit portions 3a of the circuit board 3 (See Japanese Unexamined Patent Publication No. 58-182414).

However, since the above prior art electrical connection box 1 needs the separate container 2 for accommodating the electronic circuit board 3, a production cost thereof increases. Further, the circuit portions 3a of the circuit board 3 in the container 2 may be improperly connected with the circuit side connection portions 5b of the connection terminals 5 in the housing 1a (connection failure).

To avoid the higher production cost of the above prior art electrical connection box 1, it can be considered to accommodate the electronic circuit board in the electrical connection box by disposing it above the busbars without being contained in a container. In such a case, since there is no means to fix the busbars, a connector receptacle cannot be formed at the lower casing in a position facing the electronic circuit board.

Specifically, if the connector receptacle is provided in the position facing the circuit board and a mating connector is inserted thereinto, the busbar formed with tabs to be connected with the terminals of the connector rises upon being subjected to an insertion force. Particularly, when busbars are placed one over another and the tabs used for the connection with the connector project from the uppermost busbar, this uppermost busbar is likely to rise. Since the connector receptacle cannot be provided right below the circuit board, a space is wasted and busbar designing is subject to more restriction, deterring an effective arrangement.

Additionally, since the busbar side electrical connection portion 5a of the connection terminal is in the form of a slit which comes into close contact with the tab 4a of the busbar 4 in the above prior art electrical connection box 1, a large force is required to fit the electrical connection portion 5a to the tab 4a. This results in poor operability.

The above prior art electrical connection box 1 is constructed such that the circuit portions 3a of the electronic circuit board 3 in the container 2 are fitted to the circuit side electrical connection portions 5b of the connection terminals 5 accommodated in the housing 1a sideways. Since the circuit portions (connection portions) can be provided only at one side of the circuit board 3, i.e. its leading side with respect to the insertion direction, there is a limit in the circuit construction.

In view of the above, the applicant of the present application proposed a prior art electrical connection box as shown in FIGS. 19(A) and 19(B). Specifically, connection terminals 5 are accommodated in housings 6. Circuit side electrical connection portions 5b of the connection terminals 5 in the housings 6 are simultaneously fitted to circuit portions 3a at the periphery (two sides in this example) of an electronic circuit board 3 sideways. In this state, busbar side electrical connection portions 5a of the connection terminals in the housings 6 are simultaneously fitted to tabs 4a of busbars 4 from above.

However, if the sequence of the connection terminals 5 in one housing 6(A) is such that no connection terminals 5 are accommodated in the 5-th and 11-th terminal chambers from the left when viewed from front (see an arrow C) and the sequence of the connection terminals 5 in the other housing 6(B) is such that no connection terminals 5 are accommodated in the 6-th and 11-th terminal chambers from the left when viewed from front (see an arrow D) as shown in FIG. 19(B), the housings 6(A) and 6(B) may be erroneously mounted on the sides of the circuit board 3 where the circuit portions 3a(B), 3a(A) are formed, respectively.

Another known electrical connection box of the above type is as shown in FIG. 20 on which a relay integration 4 including an electronic circuit board 3 accommodated in a container 2 separate from an electrical connection box 1 is mounted. On the circuit board 3 accommodated in the relay integration 4, additional function-providing electronic devices 5 such as an alarm buzzer which operates when a driver forgets to withdraw a car key or turn car lights off are mounted while being connected with circuit portions of the circuit board 3.

The electronic devices 5 are not essential to a wiring harness system, i.e. the function of the wiring harness can be performed even if the electronic devices 5 are not mounted. The relay integration 4 is separately preassembled by accommodating the electronic circuit board 3 having the electronic devices 5 mounted thereon in the container 2 as shown in FIG. 20. The thus prepared relay integration 4 is mounted in a relay integration containing portion 6a provided at an upper casing 6 of the electrical connection box.

On the other hand, as shown in FIG. 20, a diode 8 and noise filters 7A, 7B as essential function-providing electronic devices for the construction of a wiring harness system need to be connected with the wiring harness are individually and separately mounted in receptacles 6b, 6c, 6d formed at the upper casing 6 of the electrical connection box, respectively. Instead of being mounted on the electrical connection box, those electronic devices such as a diode may be directly connected with specified wires of the wiring harness and be taped to the wiring harness obtained by bundling the wires.

Since the essential function-providing electronic devices are individually and separately connected with the electrical connection box or the wiring harness, the number of operation steps increases. Further, the electrical connection box undesirably has a larger and more complicated construction.

Furthermore, in the case that the electronic devices are directly connected with the wiring harness, an electrical connection check needs to be made for each connection, requiring a lot of labor.

Since the additional function-providing electronic devices require the container 2 for accommodating the circuit board 3 separately from the electrical connection box 1, a production cost is increased. Further, the mounting of the relay integration accommodated in the container on the electrical connection box makes the electrical connection box even larger.

The present invention was developed to solve the above problems, and an object thereof is to reduce a production cost and to provide an electrical connection box provided with an electronic circuitry capable of preventing a connection failure of the electronic circuit board with connection terminals to be connected with busbars, in particular tabs thereof.

SUMMARY OF THE INVENTION

The subject invention is directed to an electrical connection box provided with an electronic circuitry. The electrical connection box comprises casing means having at least a first casing with one or more supports and an second casing with at least one shoulder portion. The electrical connection box further includes one or more busbars. Connection terminals are connected with the circuit portions of the electronic circuit board, and this preassembly is set substantially along a coupling direction of the first and second casings such that the connection terminals are fitted to or connected with the busbars. The second casing is fitted on the first casing for pressingly fixing the electronic circuit board.

The electrical connection box further comprises a housing in which terminal chambers for the connection terminals are arranged substantially side by side. The housing is mounted or mountable on the periphery of the electronic circuit board after the connection terminals are accommodated therein, so as to connect the connection terminals with the circuit portions.

Preferably, the second casing is lockingly fitted on the first casing so as to substantially cover the busbars and the electronic circuit board and/or to pressingly fix the housing mounted on the electronic circuit board by the shoulder portion.

Each connection terminal preferably comprises a first or circuit side electrical connection portion to be connected with the corresponding circuit portion. Each connector terminal also includes a second or busbar side electrical connection portion to be connected with the corresponding busbar. The first and second electrical connection portions extend in directions at an angle different from 0° or 180°, preferably substantially normal to each other.

The electrical connection box may further comprise one or more insulation plates, and the busbars and the insulation plate may be stacked on the first casing.

Most preferably, the preassembly of the connection terminals connected or connectable with the circuit portions is set substantially along a coupling direction of the first and second casing such that the connection terminals are fitted to tabs of the busbars, and the electronic circuit board is placed on the supports projecting from the first casing.

The above electrical connection box is assembled as follows. The busbars comprising the upward projecting tabs are set on the upper surface of the lower casing from above. The circuit side electrical connection portions of the connection terminals accommodated in the housing are fitted to the circuit portions of the electronic circuit board sideways. The electronic circuit board is set on the upper faces of the supports provided at the upper surface of the lower casing while the busbar side electrical connection portions of the connection terminals are fitted to the tabs of the busbars from above. The upper casing is fitted and locked with the lower casing. At this time, the electronic circuit board is pressed against the upper faces of the supports via the housing by the shoulder portion of the upper casing.

As described above, in the electrical connection box according to the invention, the electronic circuit board is rationally accommodated in a containing portion provided in a casing comprised of the upper and lower casings without being contained in a separate container.

As is clear from the above description, a production cost can be reduced by eliminating the separate container for the electronic circuit board which is necessary with the prior art electrical connection box described above and illustrated in FIG. 18.

Preferably, outer surfaces of the supports projecting from the lower casing are flush with outer surfaces of the lower casing and the periphery of the electronic circuit board is flush with the outer surfaces of the support and of the lower casing so that the upper casing cannot be fitted on the lower casing when the electronic circuit board is displaced.

With the above arrangement, when the electronic circuit board set on the supports is displaced, i.e. when the connection terminals in the housing are not properly connected with the tabs of the busbars, the electronic circuit board obstructs the engagement of the upper casing with the lower casing. In other words, if an arrangement is made such that the upper casing cannot be fitted on the lower casing when the electronic circuit board is displaced, it can be easily known that the busbar side electrical connection portions of the connection terminals in the housings are improperly connected with the tabs of the busbars. Accordingly, improper mounting or connection of the electronic circuit board can be easily seen and, hence, can be prevented by properly correcting the connection.

The invention also is directed to a connection construction for busbars and an electronic circuit board in the above described electrical connection box. The connection construction is adapted to electrically connect circuit portions of an electronic circuit board with one or more busbars in an electrical connection box. The connection construction comprises a housing mounted on the electronic circuit board, at least one first error assembly preventing rib or means provided at the housing, and at least one second error assembly preventing means formed at the electronic circuit board. The first error assembly preventing means and the second error assembly preventing means are insertable or fittable into each other. The positions of the corresponding first error assembly preventing means and second error assembly preventing means is changeable in accordance with the sequence arrangement of connection terminals to be accommodated in the housing.

Thus there is provided a connection construction of busbars and an electronic circuit board in an electrical connection box provided with an electronic circuitry which is capable of preventing an error assembly of housings for accommodating connection terminals for connecting the busbars and the electronic circuit board.

The first error assembly preventing means may comprise an error assembly preventing rib and/or the second error assembly preventing means comprises a slit.

The connection construction may further comprise one or more of the above described connection terminals for connecting the circuit portions of the electronic circuit board with the busbars, wherein the connection terminals are accommodated preferably in the housing.

The error assembly preventing rib may be connected with a hinge that can be pivoted substantially along the widthwise direction of the housing and that can be locked in at least one pivotal position. Thus the position of the error assembly preventing rib, in the housing is preferably changed by a pivoting movement.

At least one slit may be formed at the electronic circuit board into which the corresponding rib of the housing may be fittable. The positions of the corresponding rib and slit are changed in accordance with the sequence of the connection terminals to be accommodated in the housing.

Accordingly, the position of the error assembly preventing rib is changed in accordance with the sequence of the connection terminals to be accommodated in the housing, and the slit corresponding to this rib is formed at the electronic circuit board. Accordingly, unless the position of the rib corresponds with that of the slit, the rib cannot be fitted into the slit, i.e. the housing cannot be mounted on the electronic circuit board. Therefore, an error assembly of the housing can be prevented.

The above described hinged error assembly preventing rib enables a change in circuit construction to be coped with only by changing the position(s) of the slit(s) in the electronic circuit board without preparing many kinds of housings having the ribs in different positions. Therefore, a production cost can be reduced by reducing the kinds of housings.

Essential function-providing electronic devices for a wiring harness system, such as a diode and a noise filter, and additional function-providing electronic devices, such as an alarm buzzer which operates when a driver forget to turn car lights off or to withdraw a car key, may be mounted on the electronic circuit board.

If the essential function-providing electronic devices, such as a diode and a noise filter, and the additional function-providing electronic devices, such as an alarm buzzer, are mounted on the electronic circuit board to be accommodated in the electrical connection box, and if they are connected with the busbars accommodated in the electrical connection box via the connection terminals as above, then they need not separately be connected with the wiring harness or the electrical connection box as in the prior art of FIG. 20. As a result, the number of operation steps can be reduced; an electrical connection check can easily be made; and the electrical connection box can be made smaller. Further, since the electronic circuit board is accommodated particularly in an electronic circuitry containing portion provided in the casing comprised of the lower and upper casings, a special container which is necessary in the prior art can be eliminated, thereby reducing a production cost and enabling the downsizing of the electrical connection box.

As is clear from the above description, in the prior art of FIG. 20, the essential function-providing electronic devices, were separately and directly connected with the electrical connection box or with the wiring harness. Also, in the prior art, the additional function-providing electronic devices were which mounted on the electronic circuit board accommodated in the special container. However, with the subject invention, both the essential function-providing devices and the additional function-providing devices are mounted on a single electronic circuit board which is accommodated in the casing of the electrical connection box comprised of the lower and upper casings. Accordingly, the electronic devices can be assembled into the electrical connection box by a single assembling operation, thereby considerably reducing the number of operation steps during the assembly. Further, an electrical connection check for these electronic devices can be easily made.

The electrical connection box may be provided with guide means that project from the casing means and/or from the insulation plate. The guide means contact and position the housing. The guide means may be guide ribs that substantially face each other so that the housings mounted on the electronic circuit board can be held by the guide means. Most preferably, the housing comprises guide projections for interaction with the guide means provided at the casing means and/or at the insulation plate. The guide ribs may project from the lower casing and the insulation plate and come into contact with the outer surface of the housing being set from above so as to position the housing.

The housing mounted on the electronic circuit board is restrictively guided by the guide ribs when being set in the electrical connection box, and hence can be securely located in the specified position. As a result, the connection terminals accommodated in the housing can be securely connected with the circuit portions of the electronic circuit board and with the tabs of the busbars, thereby preventing an improper connection.

As is clear from the above description, when the electronic and/or electric circuit board preassembled with the housings, is set from above toward the tabs of the busbars, the housings accommodating the connection terminals are restrictingly guided by the guide ribs projecting from the lower casing and the insulation plate. Accordingly, the housings can be automatically inserted to and held in the proper positions. Therefore, the connection terminals in the housings can be securely and properly connected with the tabs of the busbars, thereby improving the reliability of the electrical connection.

In addition to the lateral positioning by the guide ribs, the circuit board is positioned with respect to the vertical direction by being tightly held between the supports projecting from the lower casing and the shoulder portions provided at the upper casing. Accordingly, the connection terminals can be held securely connected with the tabs of the busbars and with the circuit portions of the electronic circuit board.

Preferably, an upper portion of each guide rib is thinned by being slantingly cut away. Such thinned guide ribs facilitates the mounting of the electronic circuit board preassembled with the housing and reduces a required insertion force.

Preferably, two housings are mounted on the opposite peripheral sides of the electronic circuit board, and the guide ribs are provided to face each other so that the housings mounted on the electronic circuit board are held by the guide ribs.

If the electronic circuit board is fixed by being tightly held between the supports and the shoulder portion as above, it can be positioned with respect to the vertical direction. Since the guide ribs perform a lateral positioning, the electronic circuit board and the housing can be located in the specified position, with the result that the connection terminals in the housing can be securely connected with the circuit portions and the busbars.

The invention also is directed to a busbar fixing construction for an electrical connection box provided with an electronic circuitry. The busbar fixing construction includes an electronic circuit board accommodated in proximity to a portion of one or more insulation plates and/or one or more busbars. A pressing cover for the busbars and/or insulation plates is arranged on a surface of the most outward one of the busbars and/or insulation plates.

Thus busbars located below an electronic circuit board are fixed so that a connector receptacle can be provided at a lower casing below the electronic circuit board.

According to a preferred embodiment, there is provided a locking means comprising a locking claw projecting substantially at the periphery of the pressing cover, and an engaging claw projecting from a casing means. The locking claw and the engaging claw are engageable to mount the pressing cover on a surface of the busbar and/or insulation plate.

Preferably, there is provided a locking means comprising a cover projection formed substantially at the periphery of the pressing cover and a notch formed in a housing. The notch accommodates connection terminals mounted on the electronic circuit board. The cover projection is insertable into the notch to fix the pressing cover on a surface of the busbar and/or insulation plate.

Most preferably, a connector receptacle is formed at a casing means in proximity of the electronic circuit board, and one or more tabs of the busbars project into the connector receptacle, in particular through holes provided in the casing means, to be connectable with an outer circuitry and/or wire harness.

As is clear from the above description, the upper surface of the busbar located right below the electronic circuit board is pressed by the busbar pressing cover. This securely prevents the busbars from rising, enabling a connector receptacle to be provided at the lower casing located right below the electronic circuit board. As a result, the space inside the electrical connection box can be effectively utilized.

Further, the busbar pressing cover can be easily arranged in a specified position by engaging the projecting locking claw with the engaging claw of the lower casing. If a projection is formed at the busbar pressing cover and is fitted into a notch formed in the housing mounted on the electronic circuit board to press the busbar pressing cover by this housing, the busbar pressing cover can be more securely positioned and held, thereby easily preventing the busbars from rising.

If the electronic circuit board is tightly fixed and held between the supports and the shoulder portion as described above, it can be positioned with respect to the vertical direction. Therefore, the connection terminals in the housing can be securely connected with the circuit portions and the busbars by holding the electronic circuit board and the housing in specified positions.

The invention also is directed to a connection terminal for connecting at least one busbar and an electronic circuit board. The terminal comprises a circuit side electrical connection portion which opens in or to a first surface of the connection terminal so as to be fittable, preferably sideways, to the corresponding circuit portion at a electronic circuit board. The terminal further comprises a busbar side electrical connection portion which opens in or to a second surface of the connection terminal so as to be fittable to a corresponding busbar, preferably from above.

Thus there is provided a connection terminal for connecting a busbar and an electronic circuit board in an electrical connection box provided with an electronic circuitry which can reduce a force to fit (or insert) the connection terminal to the busbar and the electronic circuit board and with which all peripheral sides of the electronic circuit board can be formed into connection portions.

The connection terminal may be characterized by being formed by bending a conductive metal plate or strip or wire and/or by bending a punched conductive metal plate in desired positions. The circuit side electrical connection portion preferably comprises a notch which extends in or along a direction of insertion of the connection terminal on the circuit portion, preferably a horizontal direction. The circuit side electrical connection preferably is formed at an upper part of one side of the connection terminal and/or a spring tongue portion folded back at an upper end and preferably formed at the upper surface of the notch. The notch may be fittable to the circuit portion sideways so as to bring the circuit portion into pressing contact with the spring tongue portion. A reinforcing frame portion may be provided in the connection terminal, particularly below the notch. The busbar side electrical connection portion may extend in or along a direction of insertion of the connection terminal in or on the busbar, preferably a vertical direction. The busbar side electrical connection portion comprises a spring tongue portion, and a contact portion, which are preferably opposed to each other at a bottom part of the opposite side of the connection terminal. The busbar is insertable into a clearance between the contact portion and the spring tongue portion for the electrical connection.

Since the spring tongue portions are provided at the circuit side and busbar side electrical connection portions, a force to fit (or insert) these electrical connection portions to the circuit portion and the tab can be reduced, thereby improving operability.

As is clear from the above description, since the spring tongue portions are provided at the circuit side and busbar side electrical connection portions of the connection terminal which are fitted to the circuit portion of the electronic circuit board and the tab of the busbar, respectively, a fitting force can be reduced, thereby improving operability.

Further, since the busbar side electrical connection portions of the connection terminals are fitted to the tabs of the busbars from above after the circuit side electrical connection portions thereof are fitted to the circuit portions of the electronic circuit board sideways, the busbar side electrical connection portions can be smoothly fitted to all corresponding tabs of the busbars from above even if the circuit side electrical connection portions are fitted to the circuit portions at all peripheral sides (four sides) of the electronic circuit board. Thus, a limit in circuit construction can be eliminated. Preferably, the circuit side electrical connection portion is fitted to the circuit portion at the peripheral side of the electronic circuit board after the connection terminal is accommodated in a housing in which terminal cavities are arranged side by side, and then the busbar side electrical connection portion is fitted to the tab of the busbar.

Accordingly, since the connection terminals are accommodated in the housing, the circuit side electrical connection portions of the connection terminals can be simultaneously fitted sideways to the corresponding circuit portions at the peripheral side of the electronic circuit board by mounting the housing on the electronic circuit board. In this state, the busbar side electrical connection portions can be simultaneously fitted to the tabs of the busbars from above. Accordingly, operability can be further improved.

When the circuit side electrical connection portion is fitted to the electronic circuit board, the notch firmly holds its configuration since the reinforcing frame portion is provided below the notch. Such a notch securely ensures a contact force between a conductive path of the electronic circuit board and the spring tongue portion, thereby improving the reliability of electrical contact.

BRIEF DESCRIPTION OF THE DRAWINGS

These and other objects, features and advantages of the present invention will become more apparent upon a reading of the following detailed description and accompanying drawings in which:

FIG. 4 is a side view in section of the assembled electrical connection box.

FIGS. 5(A) to 5(C) show a busbar pressing cover according to the invention, wherein FIG. 5(A) is a perspective view, FIG. 5(B) is a section along 5B—5B of FIG. 5(A), and FIG. 5(C) is a section along 5C—5C of FIG. 5(A).

FIGS. 8(A) to 8(D) show a modification of an engaging portion formed at a lower casing, wherein FIG. 8(A) is a plan view, FIG. 8(B) is a section along 8B—8B of FIG. 8(A), FIG. 8(C) is a section along 8C—8C of FIG. 8(B) and FIG. 8(D) is a perspective view of an essential portion of the modification.

FIGS. 9(A) and 9(B) show a connection terminal according to the sixth aspect of the invention, wherein FIG. 9(A) is a side view in section of the connection terminal assembled into an electrical connection box after being accommodated in a housing and FIG. 9(B) is a side view in section of the connection terminal assembled into the electrical connection box without being accommodated in the housing.

FIG. 10(A) is a side view of the connection terminal, and FIG. 10(B) is a section of FIG. 10(A).

FIG. 11(A) is a section showing how an electronic circuit boar preassembled with the housings is mounted.

FIGS. 14(A) to 14(E) show a modification of the housings and the electronic circuit board, wherein FIG. 14(A) is a partial front view of the housing, FIG. 14(B) is a section along 14B—14B of FIG. 14(A), FIG. 14(C) is a section along 14C—14C of FIG. 14(B), FIGS. 14(D) and 14(E) are partial plan views of the electronic circuit board.

FIGS. 16(A) and (16B) are partial sections showing the insertion of a housing mounted on an electronic circuit board into a casing.

FIG. 17 is a section showing the connection of connection terminals in the housings with tabs of busbars.

FIGS. 18(A) to 18(C) shows a prior art electrical connection box, wherein FIG. 18(A) is an exploded perspective view of the electrical connection box and a circuit board container, FIG. 18(B) is a partial side view in section of the electrical connection box and the container in their assembled state, and FIG. 18(C) is a side view of a connection terminal.

DETAILED DESCRIPTION OF THE PREFERRED EMBODIMENTS

Figure 1:
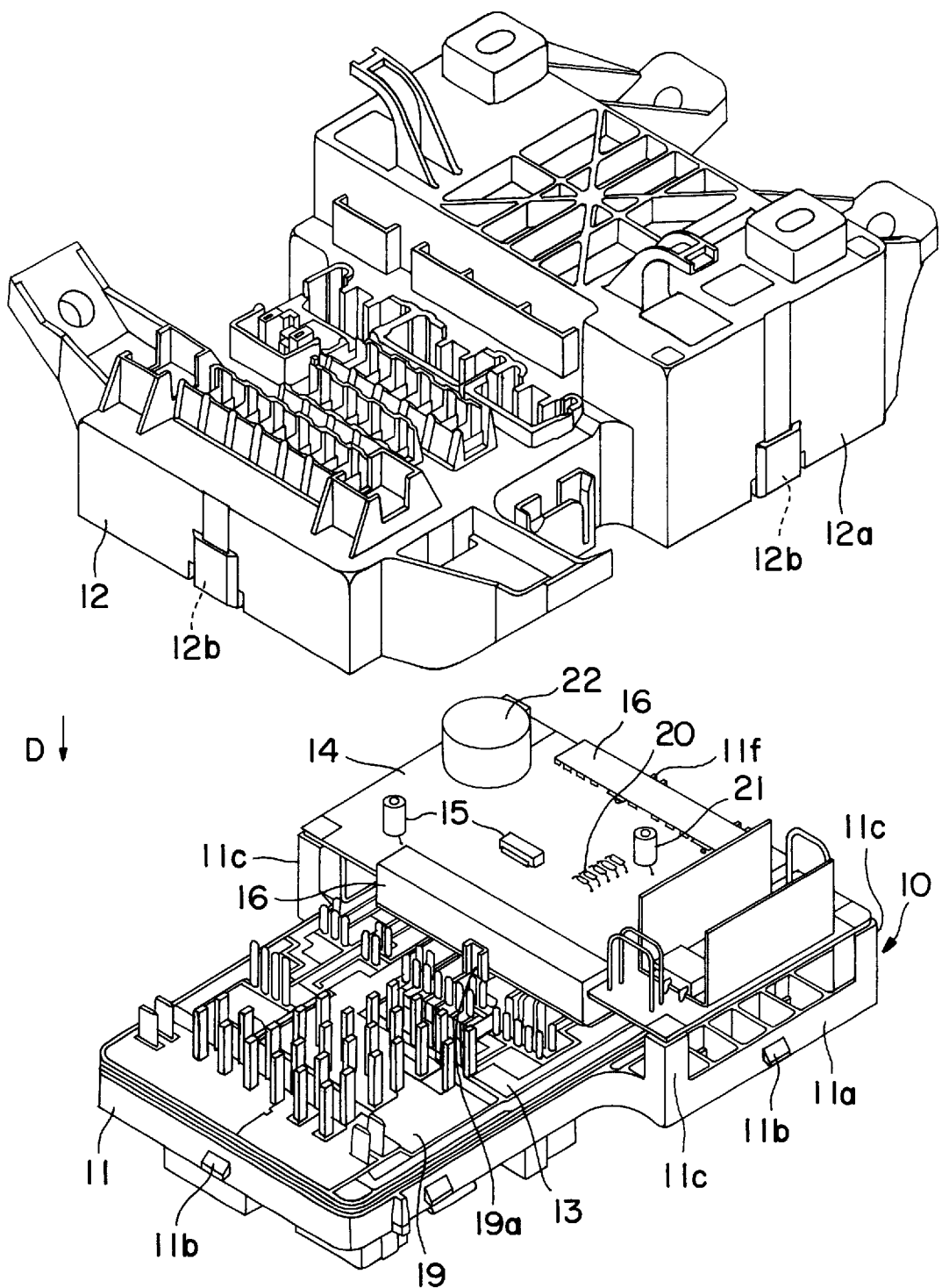
FIG. 1 is an exploded perspective view of an electrical connection box according to the invention before an upper casing is fitted.

In the following description identical or similar elements are denote with identical or similar reference numerals.

Figure 2:
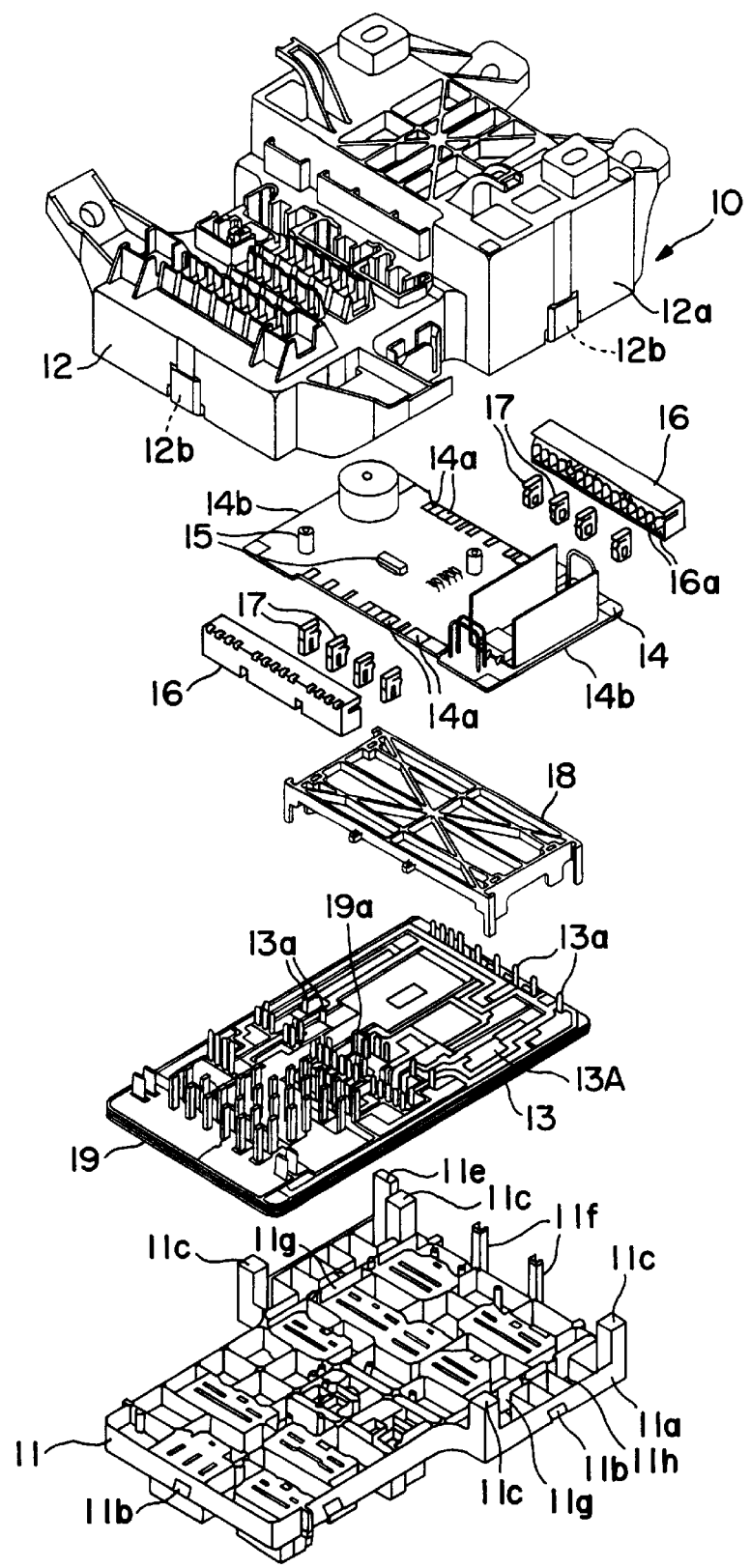
FIG. 2 is an exploded perspective view of the electrical connection box.
Figure 3:
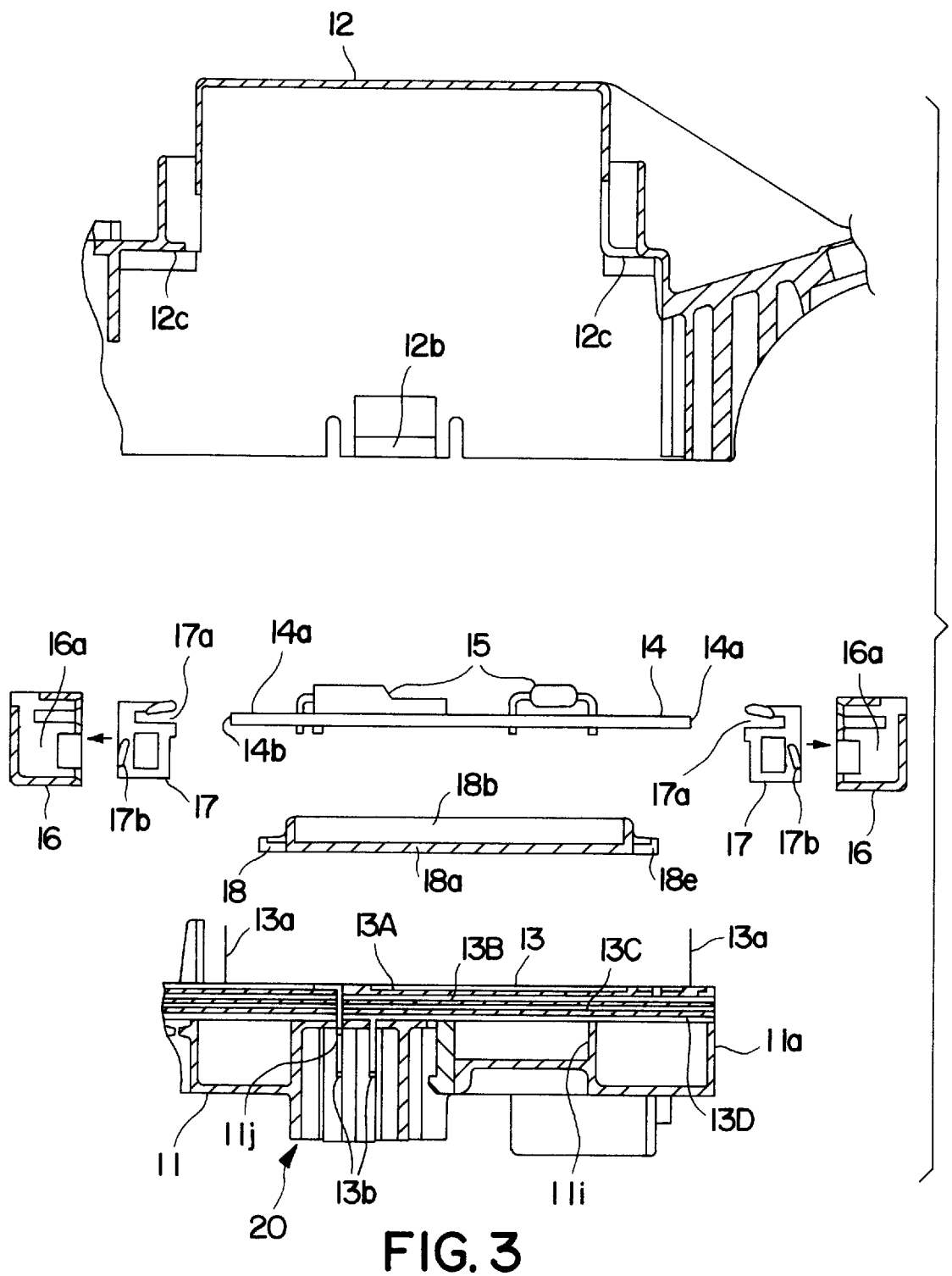
FIG. 3 is an exploded side view in section of the electrical connection box.

As shown in FIGS. 1 to 3, an electrical connection box 10 includes box-shaped lower and upper casings 11, 12 e.g. of synthetic resin. When the upper casing 12 is fitted on the lower casing 11 along a coupling or fitting direction D, locking claws 12b formed on outer surfaces 12a of the upper casing 12 are engaged with locking claws 11b formed on outer surfaces 11a of the lower casing 11, with the result that the lower and upper casings 11, 12 are locked.

As shown in FIGS. 1–7, one or more busbars 13 are set from above and positioned on the upper surface of the lower casing 11. Specifically, a plurality of busbars 13A, 13B, 13C and 13D are placed one over another, with insulation plates 19 disposed between two consecutive busbars, on a plurality of holding walls 11i projecting from the bottom surface of the lower casing 11. The busbars 13 are formed with upward projecting tabs 13a and/or downward projecting tabs 13b.

A busbar pressing cover 18 is provided on the upper surface of a part of the uppermost busbar 13A so as to prevent the busbars 13 from rising. The position of the cover 18 is below a position where an electronic circuit board 14 as described later is to be disposed. In positions other than the position of the circuit board 14, the uppermost busbar 13A is securely held by the upper casing 12, thereby preventing the busbars 13 from rising.

Figure 5A:
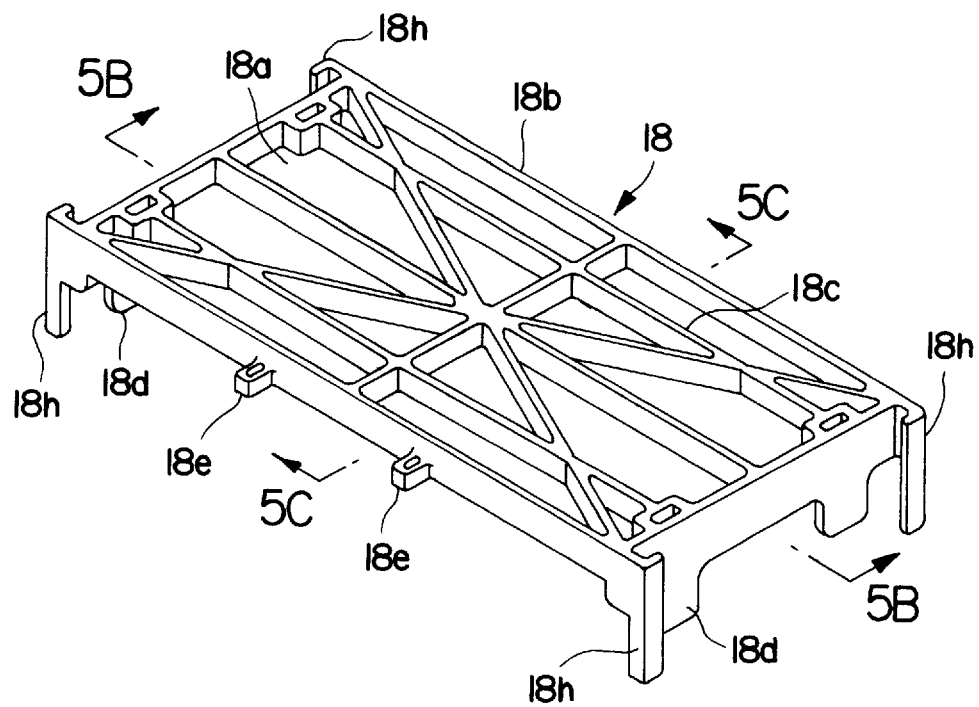
Figure 5B:
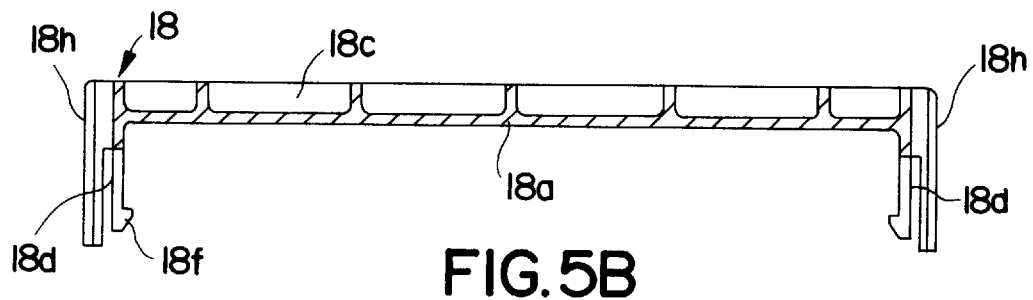
Figure 5C:
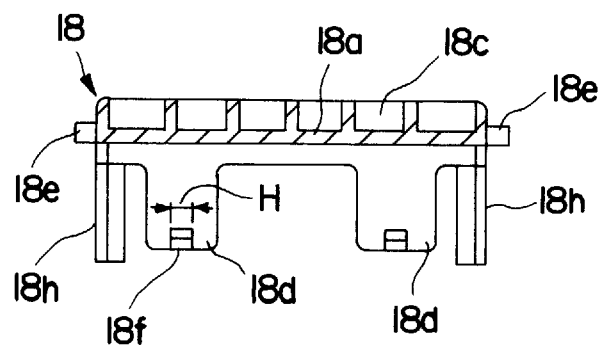

As shown in FIG. 5, the busbar pressing cover 18 includes a substantially rectangular pressing plate 18a, an outer wall portion 18b projecting upward from the periphery of the pressing plate 18a, and reinforcing ribs 18c provided inside the outer wall portion 18b. Locking portions 18d project downward at the shorter peripheral sides of the cover 18, whereas projections 18e project in a direction at an angle different from 0° or 180°, in particular substantially normal to the extension of the outer wall portion 18b at the longer peripheral sides of the cover 18. Further, L-shaped guide portions 18h project at the four corners of the cover 18. The width of the cover 18 is set smaller than the spacing of housings 16 for accommodating connection terminals 17 which are mounted at the opposite sides of the circuit board 14. This is designed to avoid the interference with the tabs 13a projecting from the busbars 13 to be connected with the connection terminals 17.

Figure 6A:
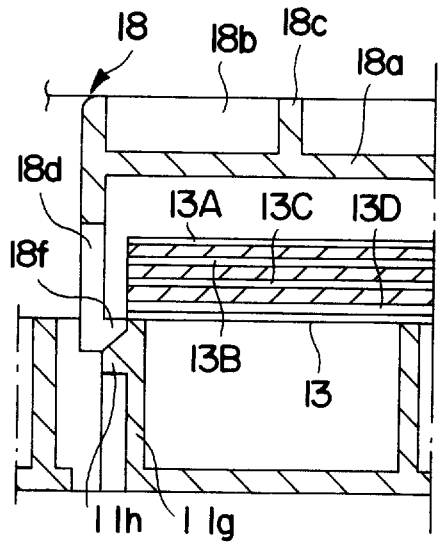
FIGS. 6(A) and 6(B) are sections showing the action of a locking portion of the busbar pressing cover.
Figure 6B:
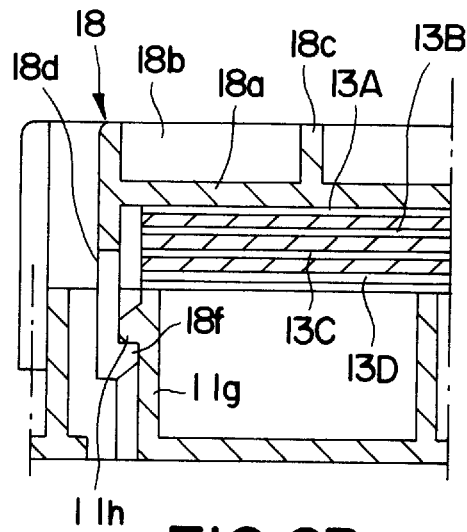

As shown in FIGS. 6(A) and 6(B), a claw 18f formed at the bottom end of each locking portion 18d is engaged with an engaging claw 11h provided at a substantially upright wall 11g of the lower casing 11 which the locking portion 18*d* is going to face, with the result that the busbar pressing cover 18 is fixedly pressed against the upper surface of the uppermost busbar 13A.

Figure 7:
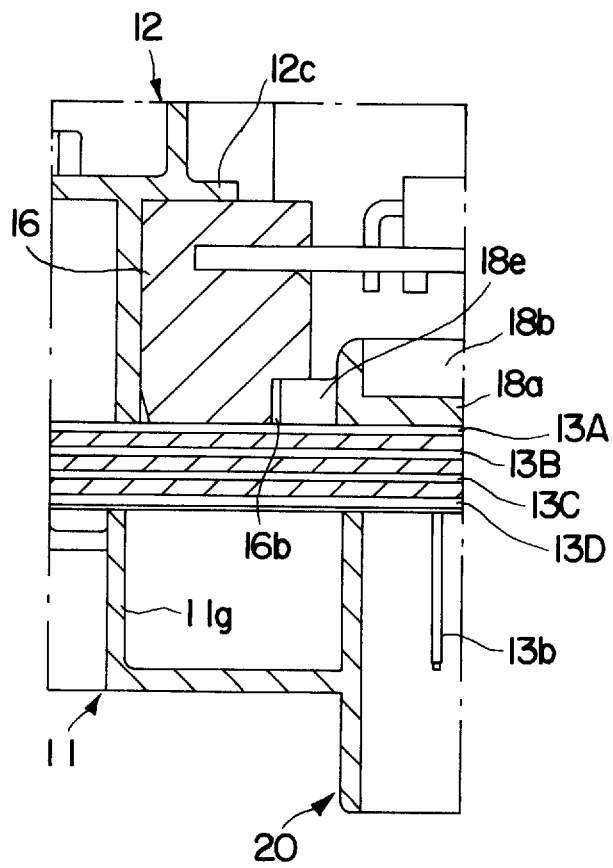
FIG. 7 is a section showing an engaged state of a projection of the busbar pressing cover.

As shown in FIG. 7, when the housing 16 mounted on the circuit board 14, as described later, is placed on the upper surface of the busbar 13A, each projection 18*e* is fitted into or inserted under a notch 16*b* formed at the bottom end of the corresponding housing 16, thereby positioning and fixing the cover 18.

Although the locking portions 18*d* and the projections 18*e* are provided as means for fixing the busbar pressing cover 18 in this embodiment, only either the locking portions 18*d* or the projections 18*e* may be provided.

Figure 8A:
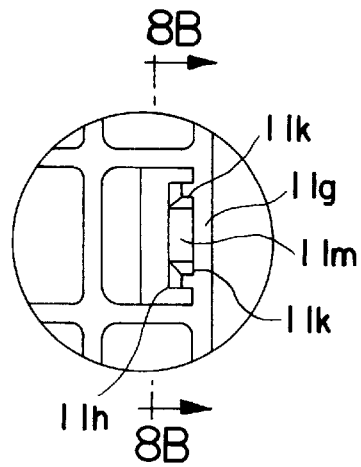
Figure 8B:
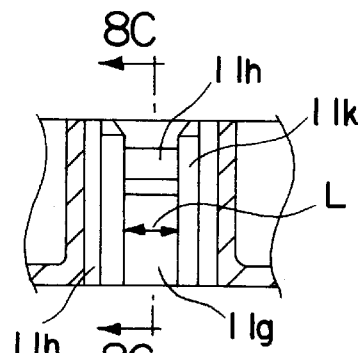
Figure 8C:
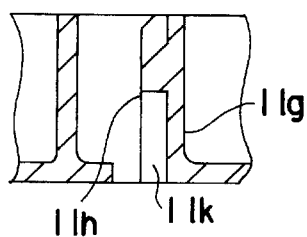
Figure 8D:
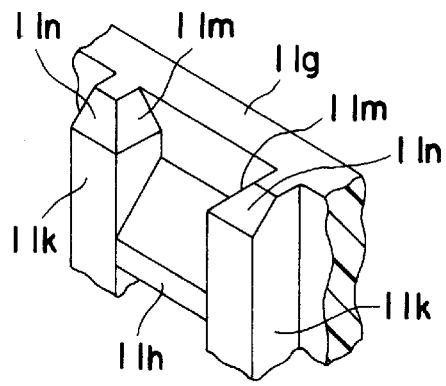

The busbar fixing construction according to the invention is not limited to the above. For example, instead of the guide portions 18*h* of the busbar pressing cover 18, a pair of substantially vertically extending guide portions 11*k* which project from the upright wall 11*g* may be provided on the opposite sides of each engaging claw 11*b* as shown in FIGS. 8(A), 8(B) and 8(C). At each guide portion 11*k*, a first taper face 11*m* is so formed as to substantially obliquely extend toward the inward from the upper end face of the guide portion 11*k*, and a second taper face 11*n* is so formed as to substantially obliquely extend toward the projecting end from the upper end face of the guide portion 11*k*.

A distance L between the guide portions 11*k* is set substantially equal to a width H of the claw 18*f* of the cover 18, so that the cover 18 can be positioned by positioning the claws 18*f* above the engaging claws 11*h* when the cover 18 is to be mounted. Because of the first and second taper faces 11*m*, 11*n*, the guide portions 11*k* are capable of smoothly guiding the claws 18*h* of the locking portions 18*d* of the cover 18 therebetween to be engaged with the corresponding engaging claws 11*h*.

The lower casing 11 is integrally or uniformly or unitarily formed with a connector receptacle 20 right below a position where the lower casing 11 faces the circuit board 14. A plurality of tab insertion holes 11*j* are formed in a portion of bottom wall of the lower casing 11 located within the connector receptacle 20. A plurality of tabs 13*b* including the tab 13*b* downwardly projecting from the uppermost busbar 13A project into the connector receptacle 20 through the holes 11*j*.

A total of preferably four supports 11*c* project to a level substantially above the busbars 13 in two right corner positions and two intermediate positions of the upper surface of the lower casing 11 with respect to its longitudinal direction. The supports 11*c* are formed such that their outer surfaces are flush with the outer surfaces 11*a* of the lower casing 11.

One of the supports 11*c* in the right corner positions stands inward of a column 11*e* standing on the lower casing 11. Outer surfaces of the column 11*e* are flush with the outer surfaces 11*a* of the lower casing 11.

An electronic circuitry containing portion is provided above the supports 11*c*. An electronic circuit board 14 to be placed in the electronic circuitry containing portion is rectangular-shaped such that its four corners can be placed on the upper faces of the supports 11*c* of the lower casing 11. At the corner of the circuit board 14 corresponding to the column 11*e*, a notch (not specifically shown) is formed so as to avoid the column 11*e*.

The lower casing 11 is also formed with guide ribs 11*f* for positioning housings 16 (described later) mounted substantially at the opposite sides of the circuit board 14 preferably when the circuit board 14 is set on the upper faces of the supports 11*c* from above. An insulation plate 19 on which the busbars 13 are placed is also formed with guide ribs 19*a* for the same purpose.

The guide ribs 11*f,* 19*a* are provided in such positions that they come into sliding contact with the outer surfaces of the housing 16 to be mounted at the opposite sides of the circuit board 14, and are adapted to guide and securely position the housings 16 mounted on the opposite sides of the circuit board 14 to be inserted between them.

An upper end portion of each guide rib 11*f* is thinned by being slantingly cut away so as to facilitate the insertion of the circuit board 14 in particular preassembled with the housings 16 between the guide ribs 11*f* and 19*a*.

The electronic circuit board 14 is formed with printed circuits (not shown) on its upper and lower surfaces, and a variety of electronic devices 15 are mounted on the circuit board 14. In particular, a diode 20, a noise filter (capacitor) 21 and like essential function-providing electronic devices, and an alarm buzzer 22 for giving a buzzing sound when a driver forgets to withdraw a car key or to turn car lights off and like additional function-providing electronic devices are mounted on the circuit board 14 while being connected with the printed circuits. The additional function-providing electronic devices are accommodated in a relay integration in prior art electrical connection boxes. As shown in FIG. 2, circuit portions 14*a* continuous with the printed circuits are formed on the opposite sides of the upper surface of the circuit board 14. The printed circuit may be formed on only either one of the upper and lower surfaces of the circuit board 14 for the electrical connection with the electronic devices to be mounted.

In this way, the essential function-providing electronic devices for the construction of the wiring harness system which have conventionally separately been connected with the electrical connection box or the wiring harness are mounted, together with the additional function-providing electronic devices, on the circuit board 14 to be accommodated in the casing comprised of the lower and upper casings 11, 12.

Housings 16 are detachably mounted on the circuit board 14. The housings 16 are made of synthetic resin and are substantially in the form of a harmonica. Connection terminals 17 are accommodated in a multitude of terminal chambers 16*a* arranged side by side in each housing 16. Further, at the bottom ends of the housings 16 which face the projections 18*e* of the busbar pressing cover 18, there are formed the notches 16*b* into which the corresponding projections 18*e* are fittable.

As shown in FIGS. 3 and 9–11, each connection terminal 17 is formed by bending a conductive metal plate or strip or wire. At an upper portion of the connection terminal 17, there is formed a circuit side electrical connection portion 17*a* opening in one side surface thereof so as to be fittable to the corresponding circuit portion 14*a* of the circuit board 14 sideways for the electrical connection. At a lower portion of the connection terminal 17, there is formed a busbar side electrical connection portion 17*b* opening in the bottom surface thereof so as to be fittable to the tab 13*a* of the busbar 13 on the lower casing 11 from above. The electrical connection portions 17*a*, 17*b* extend in directions at an angle different from 0° or 180°, in particular substantially normal to each other.

Specifically, as shown in FIG. 10 the circuit side electrical connection portion 17*a* is such that a notch 17*h* substantially extending in or along the horizontal direction (or a direction a of insertion of the connection terminal 17 onto or into the electric circuit board 14) is formed at an upper part of one side of the connection terminal 17 and a spring tongue portion 17c folded back at an upper end is formed at the upper surface of the notch 17h. The notch 17h is fitted to the circuit board 14 particularly sideways as indicated by an arrow a in FIG. 10(B), thereby bringing the spring tongue portion 17c into pressing contact with the corresponding circuit portion 14a. A substantially rectangular reinforcing frame portion 17g is provided below the notch 17h so that the notch 17 is not deformed or deformable by a pressure which acts when the circuit board 14 is inserted into the notch 17h.

The substantially vertically extending busbar side electrical connection portion 17b is formed as follows. At a bottom part of the opposite side of the connection terminal 17, a spring tongue portion 17d folded back from an edge and a contact portion 17e projecting from one end of the reinforcing frame portion 17g are substantially opposed to each other. The connection terminal 17 is moved downward or along a direction of insertion of the connection terminal 17 with the busbar 13, as indicated by an arrow b in FIG. 10(B), so that the tab 13a of the busbar 13 is inserted into a clearance between the contact portion 17e and the spring tongue portion 17d to be electrically connected.

The housings 16 are each formed with a slit 16b for permitting the connection of the circuit side electrical connection portions 17a of the connection terminals 17 with the circuit portions 14a of the circuit board 14 and a slit 16c for permitting the connection of the busbar side electrical connection portions 17b with the tabs 13a of the busbars 13.

Before the electronic circuit board 14 is assembled into the electrical connection box 10, the connection terminals 17 are set in the terminal chambers 16a of the respective housings 16, and the circuit side electrical connection portions 17a of the connection terminals 17 are fitted to the circuit portions 14a of the opposite sides of the circuit board 14 sideways.

Because of the spring tongue portions 17c, 17d, a force to fit (or insert) the circuit side and busbar side electrical connection portions 17a, 17b of the connection terminals 17 in the housings 16 to the circuit portions 14a of the circuit board 14 and the tabs 13a of the busbars 13, respectively, can be reduced, thereby improving operability. Further, since the reinforcing frame portions 17g are provided below the circuit side electrical connection portions 17a, a force which acts when the circuit board 14 is inserted into the notches 17h formed above the reinforcing frame portions 17g is scattered to the reinforcing frame portions 17g and to the housings 16 via the reinforcing frame portions 17g. This prevents the bottom parts of the notches 17h from being strained. Since the bottom parts of the notches 17h firmly hold their configuration, the spring tongue portions 17c and the circuit portions 14a of the circuit board 14 can be held in pressing contact with enhanced reliability.

Figure 11B:
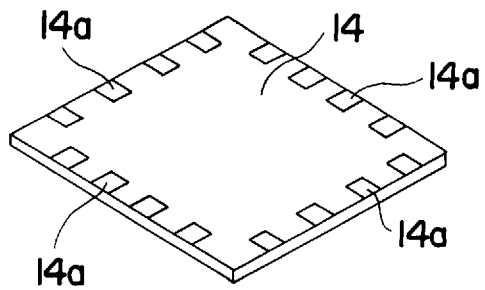
FIG. 11(B) is a perspective view of the electronic circuit board having circuit portions on all peripheral sides thereof.

Further, after the circuit side electrical connection portions 17a of the connection terminals 17 in the housings 16 are fitted to the circuit portions 14a at the peripheral sides of the circuit board 14 preferably sideways, the busbar side electrical connection portions 17b of the connection terminals 17 can be fitted to the tabs 13a of the busbars 13 from above as shown in FIG. 11(A). Accordingly, even if the circuit side electrical connection portions 17a of the connection terminals 17 are fitted to the circuit portions 14a at all peripheral sides (e.g. four sides) of the circuit board 14 as shown in FIG. 11(B), the busbar side electrical connection portions 17b thereof can be smoothly fitted to all corresponding tabs 13a of the busbars 13 preferably from above. Thus, the restriction in circuit construction is eliminated, with the result that a degree of freedom in circuit design is improved.

Figure 9A:
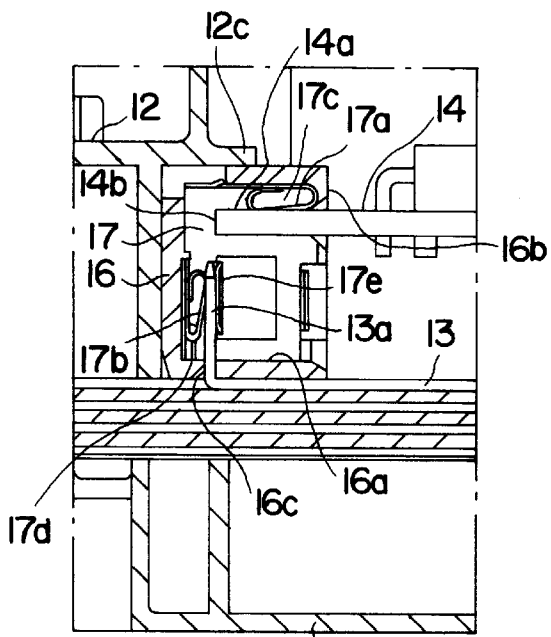
Figure 9B:
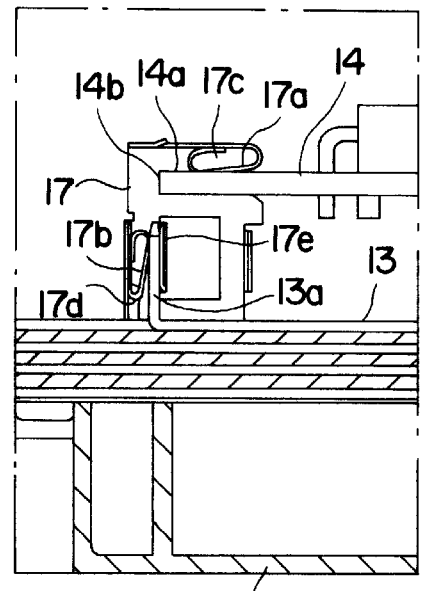

In the foregoing embodiment, the connection terminals 17 are accommodated in the housings 16 as shown in FIG. 9(A). However, as shown in FIG. 9(B), the connection terminals 17 may not necessarily be accommodated in the housings 16. In such a case, after the circuit side electrical connection portions 17a of the connection terminals 17 are fitted to the circuit portions 14a at the peripheral sides of the circuit board 14 sideways, the busbar side electrical connection portions 17b thereof are fitted to the tabs 13a of the busbar 13 from above.

Figure 12A:
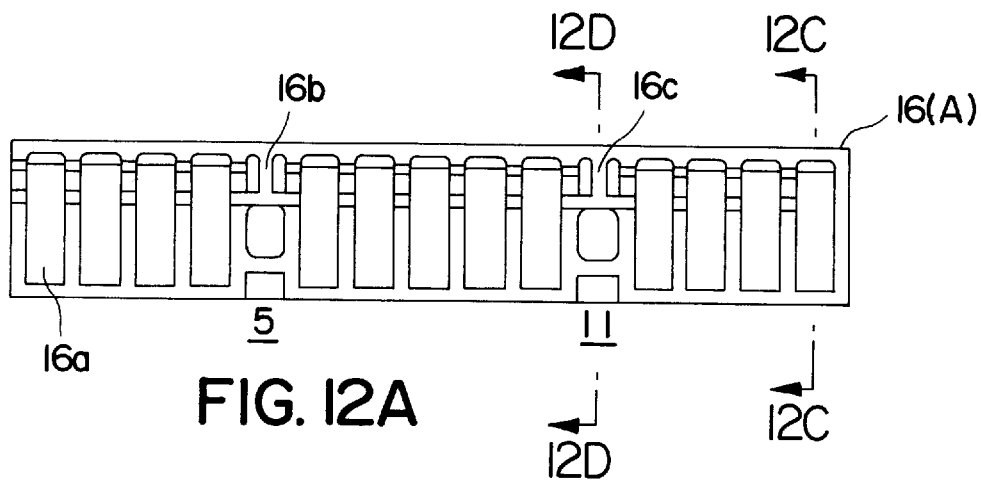
FIGS. 12(A) and 12(B) are plan views of the respective housings.
Figure 12B:
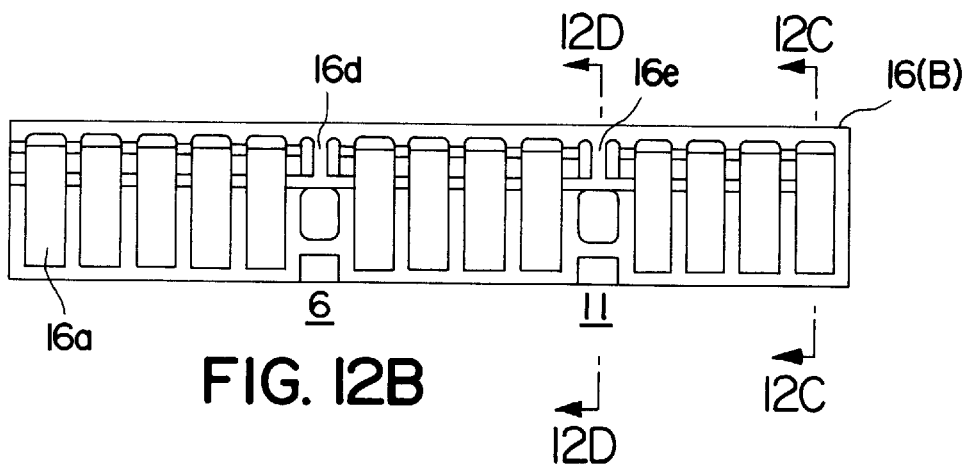
Figures 12C, 12D:
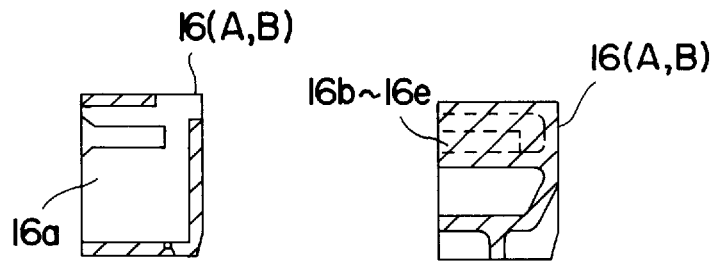
FIG. 12(C) is a section along 12C—12C of FIGS. 12(A) and 12(B)
FIG. 12(D) is a section along 12D—12D of FIGS. 12(A) and 12(B).

As shown in detail the embodiment in FIGS. 12(A), 12(B) and 12(C), no connection terminals 5 are accommodated in the 5-th and 11-th terminal chambers 16a of one housing 16(A) when viewed from front (state of FIG. 12(A)). Thin ribs 16b, 16c for preventing an error assembly are provided in these terminal chambers 16a.

Further, as shown in detail in FIG. 12(B), no connection terminals 5 are accommodated in the 6-th and 11-th terminal chambers 16a of the other housing 16(B) when viewed from front (state of FIG. 12(B)). Thin ribs 16d, 16e for preventing an error assembly are provided in these terminal chambers 16a.

Figure 13:
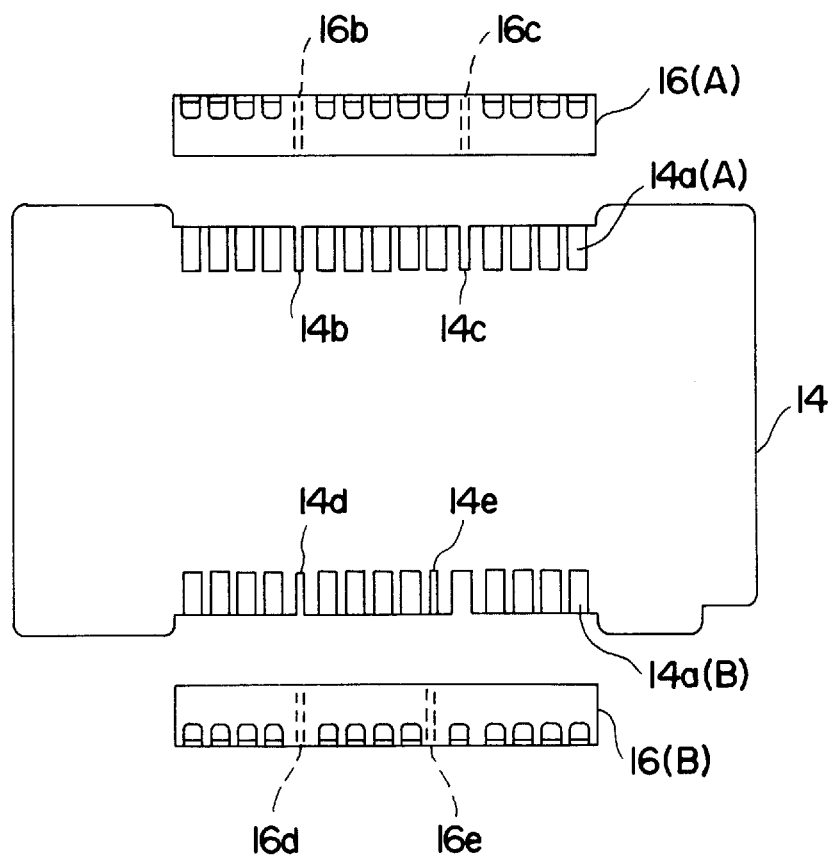
FIG. 13 is an exploded plan view of an electronic circuit board and housings according to the second aspect of the invention.

On the other hand, as shown in FIG. 13, slits 14b, 14c engageable with the ribs 16b, 16c are formed in corresponding positions of the circuit portions 14a(A) on one side of the electronic circuit board 14 where the housing 16(A) is mounted. Further, slits 14d, 14e engageable with the ribs 16d, 16e are formed in corresponding positions of the circuit portion 14a(B) on the opposite side of the electronic circuit board 14 where the housing 16(B) is mounted.

The circuit board 14 is preassembled with the housings 16(A, B) by fitting the circuit side electrical connection portions 17a of the connection terminals 17 accommodated therein to the corresponding circuit portions 14a of the circuit board 14 sideways.

At this time, if the ribs 16b, 16c and 16d, 16e of the housings 16(A, B) correspond with the slits 14b, 14c and 14d, 14e of the circuit portions 14a(A, B) of the circuit board 14, the ribs 16b, 16c and 16d, 16e can be fitted into the slits 14b, 14c, and 14d, 14e, respectively. Thus, the housings 16(A, B) can be smoothly mounted at the sides of the circuit board 14 where the circuit portions 14a(A, B) are formed.

On the other hand, if the ribs 16b, 16c and 16d, 16e of the housings 16(A, B) do not agree with the slits 14b, 14c and 14d, 14e of the circuit portions 14a(A, B) of the circuit board 14, such as the case where the housing 16(A) is erroneously fitted to the circuit portion 14a(B) of the circuit board 14 or the housing 16(B) is erroneously fitted to the circuit portions 14a(A), the ribs 16b, 16c and 16d, 16e cannot be fitted into the slits 14b, 14c, and 14d, 14e. In particular some circuit portions 14aA of the electronic circuit board 14 interact with the thin ribs 16d, 16e of the housing 16B, thereby preventing the insertion of the circuit portions 14aA into the housing 16B. Likewise also circuit portions 14aB are prevented from being inserted into the housing 16A by the thin ribs 16b, 16c. Accordingly, the housings 16(A, B) cannot be mounted at the sides of the circuit board 14 where the circuit portions 14a(A, B) are formed. Thus, an error assembly of the housings 16(A, B) can be prevented.

Figure 14A:
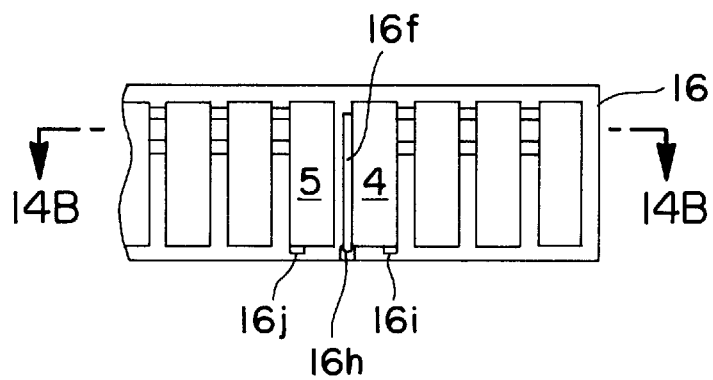
Figure 14C:
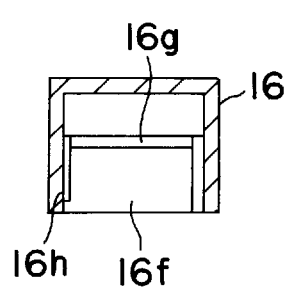
Figure 14B:
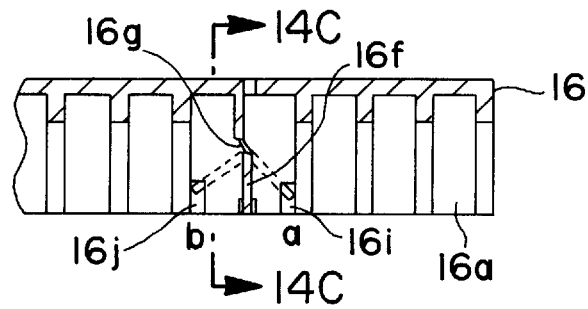

As the error assembly preventing rib, a pivotal rib 16f as shown in FIGS. 14(A) to 14(C) may be provided in the housings 16. The rib 16f is connected with a thin hinge 16g so as to be pivotal along or in the widthwise direction or the pivotal axis is substantially parallel to the longitudinal axis of the housing 16, and is locked by engaging or inserting a locking projection 16h thereof with a locking recess 16i or 16j in each of pivotal positions a, b. For example, if the rib 16f is pivoted to the pivotal position a in the housing 16, it is located in the fourth terminal chamber 16a from the right. If the rib 16f is pivoted to the pivotal position b in the housing 16, it is located in the fifth terminal 16a chamber from the right.

Figure 14D:
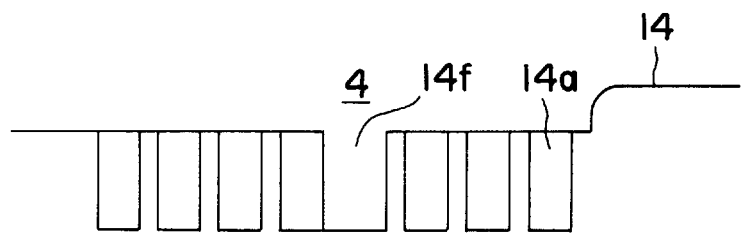
Figure 14E:
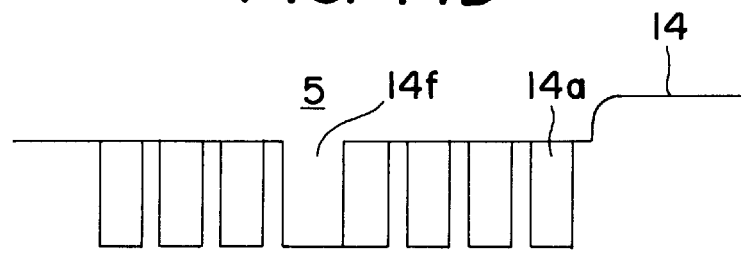

If a slit 14f is formed at the fourth circuit portion 14a of the circuit board 14 from the right as shown in FIG. 14(D), the housing 16 having the pivotal rib 16f located in the fourth terminal chamber 16a from the right can be mounted on the circuit board 14. If the slit 14f is formed at the fifth circuit portion 14a of the circuit board 14 from the right as shown in FIG. 14(E), the housing 16 having the pivotal rib 16f located in the fifth terminal chamber 16a from the right can be mounted on the circuit board 14.

Thus, by making the rib 16f pivotal so as to make the position thereof in the housing 16 changeable, a change in circuit construction can be coped with only by changing the positions of the slits 14f of the circuit board 14 without preparing many kinds of housings having the rib 16f in different positions. Therefore, a production cost can be reduced by reducing the number of kinds of the housings 16.

As is clear from the above description, the position of the error assembly preventing rib is changed in accordance with the sequence of the connection terminals to be accommodated in the housing, and the slit corresponding to this rib is formed at the electronic circuit board. Since the rib cannot be fitted into the slit unless the position of the rib corresponds with that of the slit, an error assembly of the housing can be prevented.

Further, if the error assembly preventing rib is made pivotal so as to make the position thereof in the housing changeable, a change in circuit construction can be coped with only by changing the positions of the slits at the electronic circuit board without preparing many kinds of housings having the ribs in different positions. Therefore, a production cost can be reduced by reducing the kinds of the housings.

Figure 15:
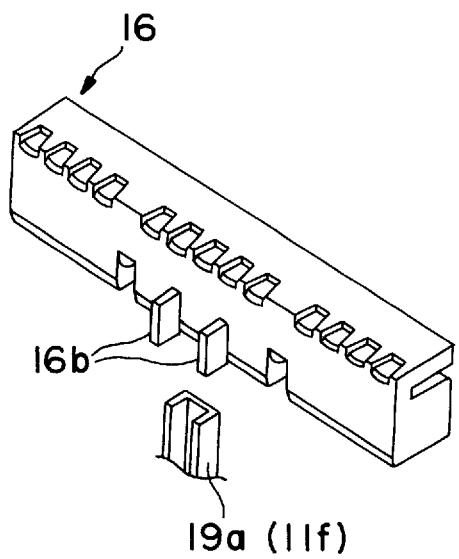
FIG. 15 is a perspective view of a modification of the housing.
Figure 18A:
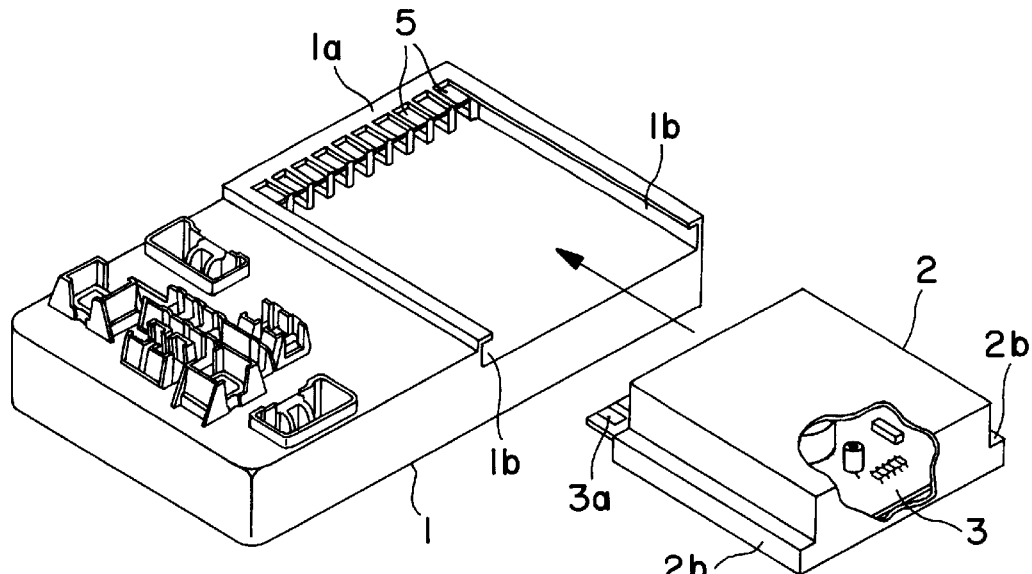
Figure 18B:
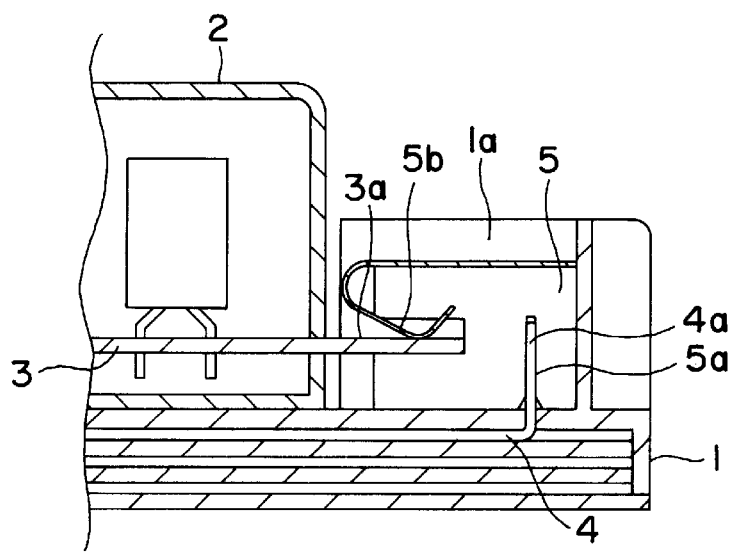
Figure 18C:
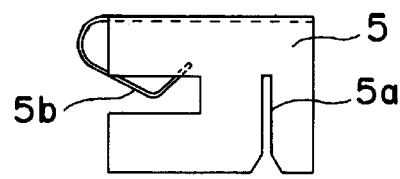
Figure 19A:
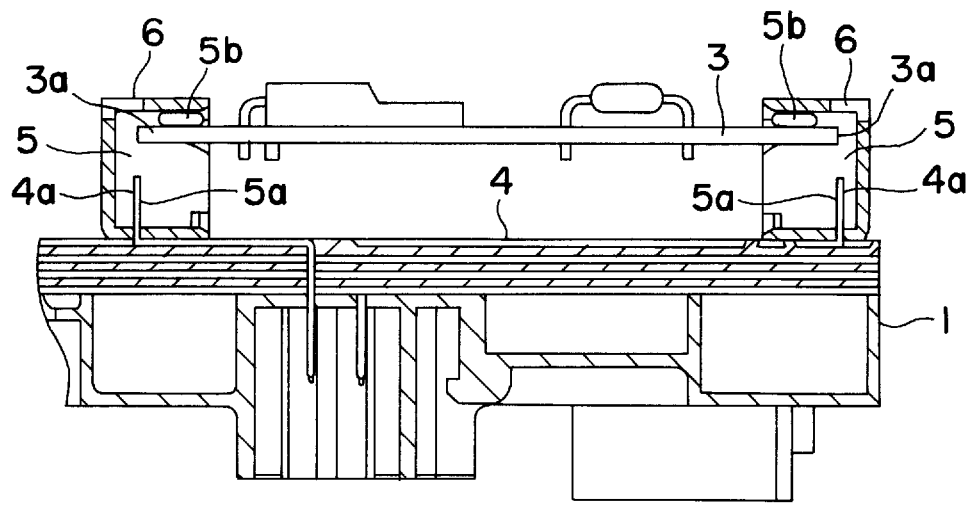
FIG. 19(A) is a section of another prior art electrical connection box.
Figure 19B:
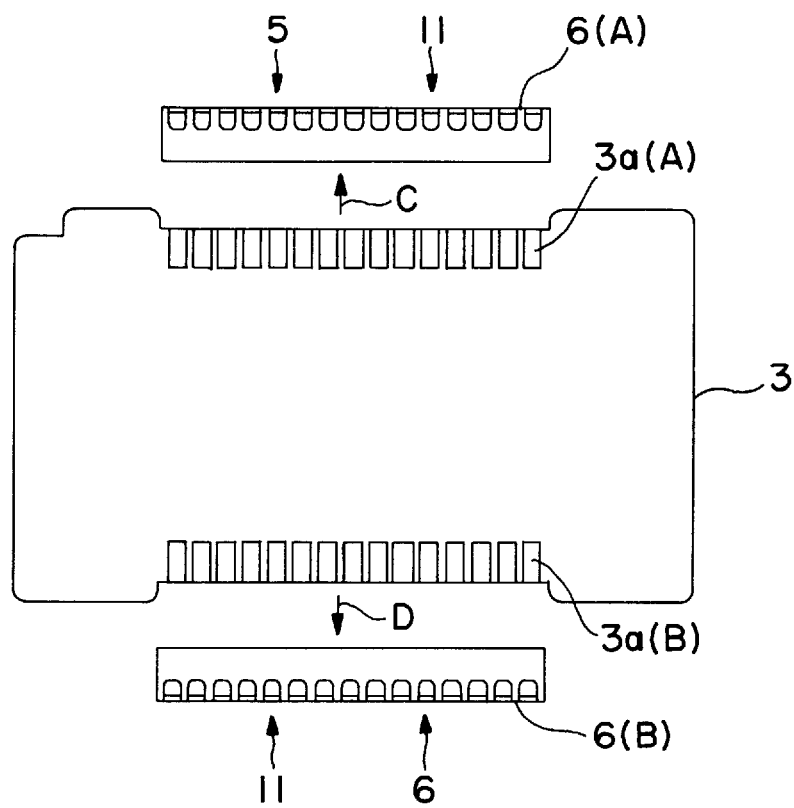
FIG. 19(B) is an exploded plan view of housings and an electronic circuit board.
Figure 20:
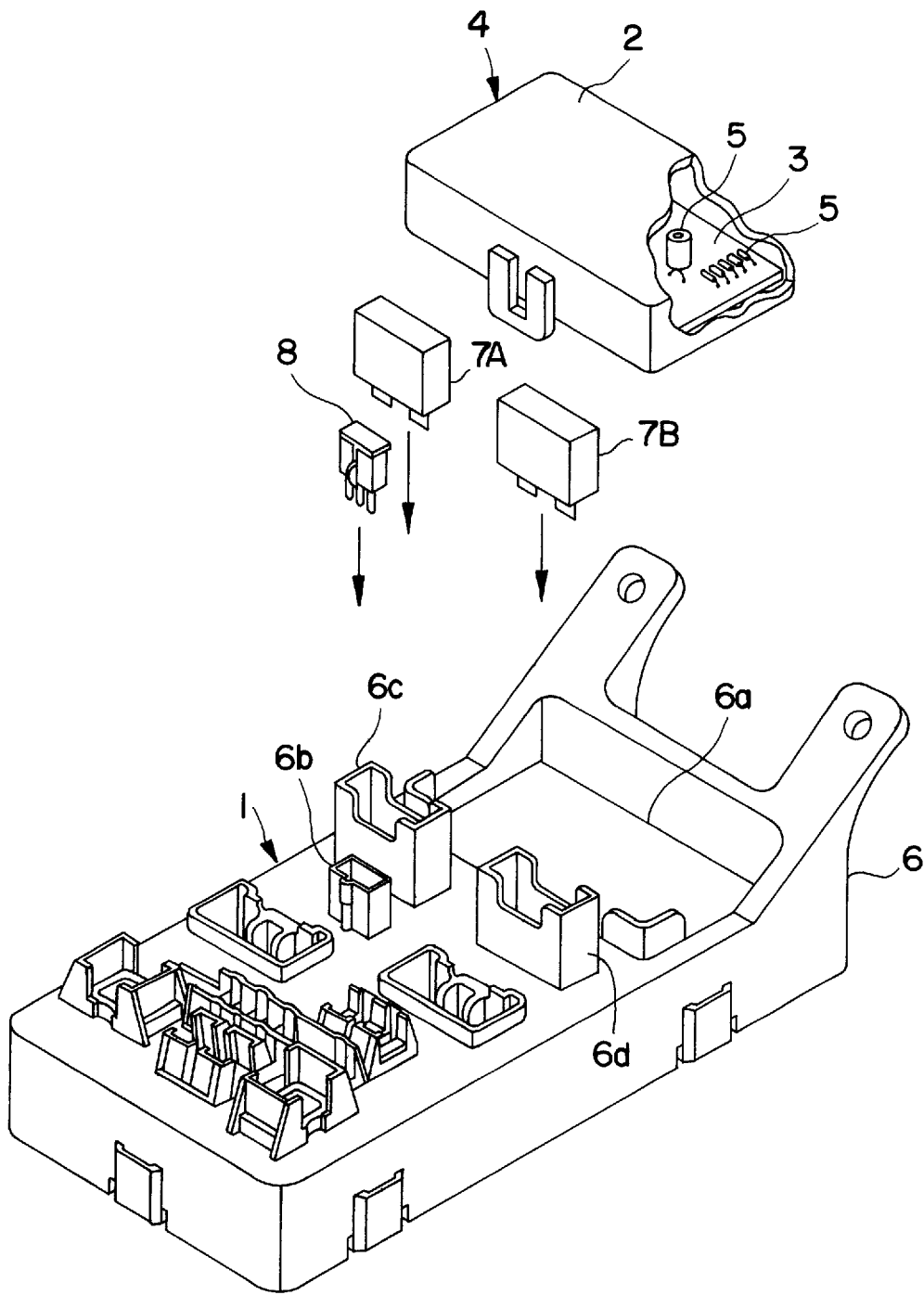
FIG. 20 is an exploded perspective view of a prior art electrical connection box provided with an electronic circuitry.

FIG. 15 shows a modification of the housing 16. In this housing 16, a pair of guide projections 16b are formed on the outer wall to face the guide rib 19a or 11f such that they will be located at the opposite sides of the guide rib 19a or 11f. With this housing 16, when assembled into the electrical connection box 10, the circuit board 14 can be easily positioned with respect to the lateral direction by holding the guide rib 19a or 11f by the pair of guide projections 16a. Accordingly, the circuit board 14 can be set in the electrical connection box 10 with an improved operability.

As shown in FIGS. 16 and 17 the circuit board 14, preassembled with the housings 16, is set from above while the outer surfaces of the housings 16 are held in sliding contact with the guide ribs 11f, 19a at the opposite sides. The busbar side electrical connection portions 17b of the connection terminals 17 accommodated in the housings 16 are fitted to the corresponding tabs 13a of the busbars 13 placed on the upper surface of the lower casing 11, whereas the circuit board 14 is set on the upper faces of the supports 11c of the lower casing 11.

At this time, since the preassembly of the circuit board 14 and the housings 16 are restrictively guided by the guide ribs 11f, 19a at the substantially opposite sides, the displacement of the circuit board 14 is automatically corrected, with the result that the housings 16 can be automatically located or arranged in their proper or suitable positions. Further, even if the housings 16 are not properly fitted to the circuit board 14, they are pressed inwardly by the guide ribs 11f, 19a at the opposite sides, thereby having their positions automatically corrected. As a result, the connection terminals 17 in the housings 16 can be properly connected with the circuit board 14.

Thus, the connection terminals 17 in the housings 16 can be securely and properly connected with the tabs 13a of the busbars 13.

If the busbars 13 set on the upper surface of the lower casing 11 are pressed by the busbar pressing cover 18 before the circuit board 14 is set on the upper faces of the supports 11c, they can be fixed in advance by being pressed.

Further, since the housings 16 and the circuit board 14 are positioned by the guide ribs 11f, 19a when the circuit board 14 is set on the upper faces of the supports 11c, the busbar side electrical connection portions 17b of the connection terminals 17 set in the housings 16 can be smoothly fitted to the tabs 13a of the busbars 13.

When the upper casing 12 is fitted on the lower casing 11 after the circuit board 14 is set as above, thereby pressing the circuit board 14 against the supports 11c of the lower casing 11 via the housings 16 by the shoulder portions 12c, the circuit board 14 is automatically fixed in the lower and upper casings 11, 12. By pressing the housings 16, the electrical connection portions 17a, 17b can be securely connected with the circuit portions 14a of the circuit 14 and the tabs 13a of the busbars 13, respectively.

The busbar side electrical connection portions 17b of the connection terminals 17 in the housings 16 may be improperly connected with the tabs 13a of the busbars 13 if the circuit board 14 is displaced while the upper casing 12 is fitted on the lower casing 11. In such a case, the periphery 14b of the circuit board 14 protrudes from the outer surfaces of the supports 11c and of the lower casing 11, and the bottom portion of the inner surfaces of the upper casing 12 come into contact with the upper surface of the circuit board 14. As a result, the upper casing 12 cannot be fitted.

Since the improper mounting or connection of the housings 16 of the circuit board 14 can be easily known, it can be prevented by properly correcting the connection.

If the electrical connection box is assembled as above, the essential function-providing electronic devices which have conventionally separately been connected with the electrical connection box or the wiring harness can be assembled into the electrical connection box by one assembling operation after being mounted on a single electronic circuit board 14. Simultaneously, the essential function-providing electronic devices are connected with the busbars 13 via the connection terminals 17.

As is clear from the above description, in the electrical connection box according to the invention, provided particularly with an electronic circuitry, the essential function-providing electronic devices, which have conventionally separately and directly been connected with the electrical connection box or the wiring harness, and the additional function-providing electronic devices, which have conventionally mounted on the electronic circuit board accommodated in the special container, are mounted on a single electronic circuit board and is accommodated in the casing of the electrical connection box comprised of the lower and upper casings. Accordingly, the electronic devices can be assembled into the electrical connection box by a single assembling operation, thereby considerably reducing the number of operation steps during the assembly. Further, an electrical connection check for these electronic devices can be easily made.

Further, unlike the prior art, the container for accommodating the electronic circuit board can be eliminated, thereby reducing a production cost and enabling the downsizing of the electrical connection box.

As is clear from the above description, the electrical connection box provided with an electronic circuitry, when being set from above while the connection terminals are fitted to the tabs of the busbars, the housings accommodating the connection terminals and mounted on the electronic circuit board are restrictingly guided by the guide ribs projecting from the lower casing and the insulation plate. Accordingly, the housings can be automatically inserted to and held in the proper positions. Therefore, the connection terminals in the housings can be securely and properly connected with the tabs of the busbars, thereby improving the reliability of the electrical connection.

In addition to the lateral positioning by the guide ribs, the circuit board is positioned with respect to the vertical direction by being tightly held between the supports projecting from the lower casing and the shoulder portions provided at the upper casing. Accordingly, the connection terminals can be held securely connected with the tabs of the busbars and with the circuit portions of the electronic circuit board.

Next, the assembly of the electrical connection box 10 is described.

First, the plurality of busbars 13A, 13B, . . . are placed one over another on the upright walls 11g of the lower casing 11 with the insulation plates 19 disposed between two consecutive busbars 13. At this time, the tabs 13b which are going to project into the connector receptacle 20 are inserted into the tab insertion holes 11j formed in the bottom wall of the lower casing 11.

Subsequently, the busbar pressing cover 18 is placed on the upper surface of the uppermost busbar 13A. More specifically, the cover 18 is placed from above in a position where the circuit board 14 is substantially placed, and is fixed or held while pressing the busbars 13 from above by engaging the locking portions 18d provided at the periphery of the cover 18 with the engaging portion 11h provided at the upright walls 11g of the lower casing 11 as shown in FIGS. 6(A) and 6(B). In this way, the busbars 13 can be fixed with respect to the lower casing 11.

Subsequently, the circuit board 14 is placed in the specified or predetermined or predeterminable position above the busbars 13. The circuit board 14 is preassembled with the housings 16 accommodating the connection terminals 17 by fitting the housings 16 to its opposite sides sideways while connecting the circuit side electrical connection portions 17a of the connection terminals 17 with the respective circuit portions 14a provided at the outer sides of the circuit board 14. The circuit board 14, preassembled with the housings 16, is placed on the upper faces of the supports 11c of the lower casing 11 while the busbar side electrical connection portions 17b of the connection terminals 17 are fitted to the tabs 13a projecting upward from the busbars 13 from above.

When the circuit board 14 is properly or suitably set on the busbars 13, the housings 16 are located on the upper surface of the busbar 13A and the projections 18e of the busbar pressing cover 18 are fitted into the notches 16b formed at the housings 16 or held or inserted between the notches 16b and the uppermost busbar 13A. In this way, the cover 18 can be securely positioned and fixed on the upper surface of the busbar 13A.

The upper casing 12 is fitted on the lower casing 11 after the circuit board 14 is set as described above, with the result that the circuit board 14 is pressed against the supports 11c of the lower casing 11 via the housings 16 by the shoulder portions 12c to fix the circuit board 14 within the lower and upper casings 11, 12.

In the thus assembled electrical connection box 10, the busbar pressing cover 18 is located on the upper surface of the uppermost busbar 13A. This prevents the busbars 13 from rising upon being subjected to an insertion force when a mating connector (not shown) is inserted into the connector receptacle 20 formed at the lower casing 11. Thus, the connector receptacle 20 used for the electrical connection with an external circuit or the like can be formed at the lower casing 11 in a position corresponding to the circuit board 14.

As is clear from the above description, in the busbar fixing construction of the invention, particularly in the electrical connection box provided with an electronic circuitry, the electronic circuit board is accommodated in the containing portion provided in the casing of the electrical connection box without being contained in a separate container. Accordingly, no special container is necessary for the electronic circuit board, which reduces a production cost and makes the electrical connection box smaller. Further, the upper surface of the busbar located right below the electronic circuit board is pressed by the busbar pressing cover. This securely prevents the busbars from rising, enabling a connector receptacle to be provided at the lower casing located right below the electronic circuit board. As a result, the space inside the electrical connection box can be effectively utilized.

Further, the busbar pressing cover can be easily arranged in a specified position by engaging the projecting locking claw with the engaging claw of the lower casing. If a projection is formed at the busbar pressing cover and is fitted into a notch formed in the housing mounted on the electronic circuit board to press the busbar pressing cover by this housing, the busbar pressing cover can be more securely positioned and held, thereby easily preventing the busbars from rising.

As is clear from the above description, since the spring tongue portions are provided at the circuit side and busbar side electrical connection portions of the connection terminal which are fitted to the circuit portion of the electronic circuit board and the tab of the busbar, respectively, a fitting force can be reduced, thereby improving operability.

Further, since the busbar side electrical connection portions of the connection terminals are fitted to the tabs of the busbars from above after the circuit side electrical connection portions thereof are fitted to the circuit portions of the electronic circuit board sideways, the busbar side electrical connection portions can be smoothly fitted to all corresponding tabs of the busbars from above even if the circuit side electrical connection portions are fitted to the circuit portions at all peripheral sides (four sides) of the electronic circuit board. Thus, a limit in circuit construction can be eliminated.

Furthermore, since the connection terminals are accommodated in the housing, the circuit side electrical connection portions of the connection terminals can be simultaneously fitted sideways to the corresponding circuit portions at one peripheral side of the electronic circuit board by mounting the housing on the electronic circuit board. In this state, the busbar side electrical connection portions can be simultaneously fitted to the tabs of the busbars from above. Accordingly, operability can be further improved.

What is claimed is:

1. An electrical connection box (10) provided with an electronic circuitry, comprising:
   a first casing (11) provided with one or more supports (11c);
   at least one busbar (13) mounted on the first casing;
   an electronic circuit board (14) having circuit portions (14a) thereon, said electronic circuit board (14) being disposed in proximity to said support (11c) of said first casing (11);
   connection terminals (17) having a first portion connected to a respective one of said circuit portions (14a) of said electronic circuit board (14) and having a second portion connected in a coupling direction (D) to the busbar (13); and
   a second casing (12) having at least one shoulder portion (12c), said second casing (12) being mounted in the coupling direction (D) over the electronic circuit board (14) and engaged with the first casing (11) such that the electronic circuit board (14) is pressingly fixed in proximity to the support (11c) of the first casing (11) and such that the connection terminals (17) are retained in connection with the busbar (13).

2. An electrical connection box according to claim 1, further comprising a housing (16) in which terminals chambers (16a) for the connection terminals (17) are arranged substantially side by side,
   wherein the housing (16) is mounted on the periphery (14b) of the electronic circuit board (14), in particular substantially sideways, after the connection terminals (17) are accommodated therein, so as to connect the connection terminals (17) with the circuit portions (14a).

3. An electrical connection box according to claim 2, wherein the second casing (12) is lockingly fitted on the first casing (11) so as to substantially cover the busbars (13) and the electronic circuit board (14) and to pressingly fix the housing mounted on the electronic circuit board by the shoulder portion.

4. An electrical connection box according to claim 3, wherein the connection terminals each comprise a first electrical connection portion (17a) to be connected with the corresponding circuit portion (14a) and a second electrical connection portion (17b) to be connected with a tab (13a) of the corresponding busbar (13) the first and second electrical connection portions (17a, 17b) extending in directions at an angle different from 0° and 180°.

5. An electrical connection box according to claim 1, further comprising at least one insulation plate (19), wherein the busbars (13) and the insulation plate (19) are stacked on the first casing (11).

6. An electrical connection box according to claim 1, wherein a preassembly of the connection terminals (17) connected with the circuit portions (14a) is set substantially along a coupling direction (D) of the first and second casings (11, 12) such that the connection terminals (17) are fitted to tabs (13a) of the busbars (13), and the electronic circuit board (14) is placed on the supports (11c) projecting from the first casing (11).

7. An electrical connection box according to claim 1, wherein outer surfaces of the supports (11c) projecting from the first casing (11) are substantially flush with outer surfaces (11a) of the first casing (11) and a periphery (14b) of the electronic circuit board (14) is substantially flush with the outer surfaces (11a) of the support (11c) and of the first casing (11).

8. An electrical connection box according to claim 7, wherein the second casing (12) is configured to prevent fitting on the first casing (11) when the electronic circuit board (14) is displaced.

9. An electrical connection box according to claim 1, wherein essential function-providing electronic devices (20; 21) for a wiring harness system and additional function-providing electronic devices (22) are mounted on the electronic circuit board (14).

10. An electrical connection box according to claim 1, comprising:
    at least one insulation plate (19) and at least one busbar (13),
    at least one housing (16) being fittable to a peripheral side of the electronic circuit board (14), and
    guide means (11f; 19a) which project from the casings (11; 12) and the insulation plate (19) and come into contact with the housing (16) so as to position the housing (16).

11. An electrical connection box according to claim 1, further comprising at least one insulation plate (19) in supporting engagement with said busbar (13) and positioned on said first casing (11) and a pressing cover (18) for securely pressing the busbar (13) and the insulation plate (19) against the first casing (11).

12. An electrical connection box according to claim 1, comprising:
    a circuit side electrical connection portion (17a) which opens to a first surface of the connection terminal (17) so as to be fittable sideways to the corresponding circuit portion (14a) at an electronic circuit board (14), and
    a busbar side electrical connection portion (17b) which opens to a second surface connection terminal (17) so as to be fittable to a corresponding busbar (13) from above.

13. An electrical connection box according to claim 1, further comprising a connection construction for electrically connecting circuit portions (14aA; 14aB) of the electronic circuit board (14) with said at least one busbar (13) accommodated in the electrical connection box (10), a housing (16) being mounted on the electronic circuit board (14), said connection construction comprising:
    at least one first error assembly preventing means (16b–16d; 16e) provided at the housing (16), and
    at least one second error assembly preventing means (14b–14d; 14e) formed at the electronic circuit board (14), the first error assembly preventing means (16b–16d; 16e) and the second error assembly preventing means (14b–14d; 14e) being fittable into each other,
    positions of the corresponding first error assembly preventing means (16b–16d; 16e) and second error assembly preventing means (14b–14d; 14e) being changeable in accordance with a sequence of connection terminals (17) to be accommodated in the housing (16).

14. An electrical connection box according to claim 1, further comprising a busbar pressing cover (18) for securely fixing the busbar (13) to the first casing (11), said busbar pressing cover (18) comprising a substantially planar pressing plate (18a) for engaging said busbar (13) and a plurality of resiliently deflectable latches (18d) lockingly engageable with said first casing (11) for securely holding said busbar (13) to said first casing (11).

15. An electrical connection box according to claim 1, wherein each of said connection terminal (17) is unitarily formed from a conductive metal material and comprises a first notch (17a) having a resiliently deflectable contact portion (17c) for electrically engaging one of said circuit portions (14a) of the electronic circuit board (14) therein and a second notch (17b) having a resiliently deflectable contact portion (17d) for electrically connecting a tab (13a) of said busbar (13), said notches being substantially perpendicular to one another.

* * * * *